United States Patent
Mather et al.

(10) Patent No.: US 10,521,643 B2
(45) Date of Patent: *Dec. 31, 2019

(54) SYSTEMS AND METHODS FOR PERFORMING FINGERPRINT BASED USER AUTHENTICATION USING IMAGERY CAPTURED USING MOBILE DEVICES

(71) Applicant: VERIDIUM IP LIMITED, London (GB)

(72) Inventors: Jonathan Francis Mather, Oxford (GB); Asem Othman, Shrewsbury, MA (US); Richard Tyson, Oxfordshire (GB); Andrew Simpson, London (GB)

(73) Assignee: VERIDIUM IP LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,561

(22) Filed: Sep. 14, 2017

(65) Prior Publication Data
US 2018/0018501 A1 Jan. 18, 2018

Related U.S. Application Data

(63) Continuation of application No. 15/212,335, filed on Jul. 18, 2016, now Pat. No. 9,785,823, which is a continuation of application No. 14/988,833, filed on Jan. 6, 2016, now Pat. No. 9,424,458, which is a continuation-in-part of application No. 14/819,639, filed on Aug. 6, 2015, now Pat. No. 9,361,507.
(Continued)

(51) Int. Cl.
*G06K 9/00* (2006.01)
*G06T 7/11* (2017.01)
*G06K 9/66* (2006.01)

(52) U.S. Cl.
CPC ......... *G06K 9/00093* (2013.01); *G06K 9/001* (2013.01); *G06K 9/00006* (2013.01);
(Continued)

(58) Field of Classification Search
CPC .. G06K 9/00093; G06K 9/001; G06K 9/0008; G06K 9/0012; G06K 9/00012;
(Continued)

(56) References Cited

U.S. PATENT DOCUMENTS 7,936,907 B2 *   5/2011   Maurer   ..............   G06K 9/00067
                                                    382/124
8,724,861 B1     5/2014   Sun
(Continued)

OTHER PUBLICATIONS

International Search Report and Written Opinion for International Patent Application No. PCT/US2017/065240 dated Apr. 25, 2018. 15 pages.
(Continued)

*Primary Examiner* — John B Strege
(74) *Attorney, Agent, or Firm* — Leason Ellis LLP

(57) ABSTRACT

Technologies are presented herein in support of a system and method for performing fingerprint recognition. Embodiments of the present invention concern a system and method for capturing a user's biometric features and generating an identifier characterizing the user's biometric features using a mobile device such as a smartphone. The biometric identifier is generated using imagery captured of a plurality of fingers of a user for the purposes of authenticating/identifying the user according to the captured biometrics and determining the user's liveness. The present disclosure also describes additional techniques for preventing erroneous authentication caused by spoofing. In some examples, the anti-spoofing techniques may include capturing one or more images of a user's fingers and analyzing the captured images for indications of liveness.

24 Claims, 16 Drawing Sheets

Related U.S. Application Data

(60) Provisional application No. 62/112,961, filed on Feb. 6, 2015.

(52) U.S. Cl.
CPC ......... *G06K 9/0008* (2013.01); *G06K 9/0012* (2013.01); *G06K 9/00013* (2013.01); *G06K 9/00067* (2013.01); *G06K 9/00073* (2013.01); *G06K 9/00087* (2013.01); *G06K 9/00107* (2013.01); *G06K 9/00114* (2013.01); *G06K 9/66* (2013.01); *G06T 7/11* (2017.01); *G06K 2009/0006* (2013.01)

(58) Field of Classification Search
CPC .. G06K 9/00107; G06K 9/66; G06K 9/00114; G06K 9/00067; G06K 9/00006; G06K 9/000087; G06K 9/00073; G06K 2009/0006; G06T 7/11
See application file for complete search history.

(56) References Cited

U.S. PATENT DOCUMENTS

| | | | | |
|---|---|---|---|---|
| 9,361,507 | B1 * | 6/2016 | Hoyos | G06K 9/00073 |
| 9,424,458 | B1 * | 8/2016 | Mather | G06T 7/11 |
| 9,785,823 | B2 * | 10/2017 | Mather | G06T 7/11 |
| 2007/0112701 | A1 * | 5/2007 | Chellapilla | G06K 9/6256 |
| | | | | 706/15 |
| 2009/0190857 | A1 | 7/2009 | Epshtein et al. | |
| 2009/0310831 | A1 | 12/2009 | Zhang et al. | |
| 2010/0322300 | A1 * | 12/2010 | Li | G06K 9/00234 |
| | | | | 375/240.01 |
| 2013/0067545 | A1 * | 3/2013 | Hanes | H04L 9/3231 |
| | | | | 726/6 |
| 2013/0101186 | A1 | 4/2013 | Walch et al. | |
| 2013/0259331 | A1 | 10/2013 | Maurer et al. | |
| 2014/0294262 | A1 | 10/2014 | Schuckers et al. | |
| 2015/0055836 | A1 * | 2/2015 | Moteki | G06K 9/00355 |
| | | | | 382/124 |
| 2015/0220771 | A1 | 8/2015 | Thiebot et al. | |

OTHER PUBLICATIONS

Jiang et al. "Exploiting global and local decisions for multimodal biometrics verification." IEEE Transactions on Signal Processing 52.10 (2004): 3059-3072.

Communication Pursuant to Article 94(3) EPC in corresponding European Application No. 16723153.9, dated May 2, 2019. 8 pages.

* cited by examiner

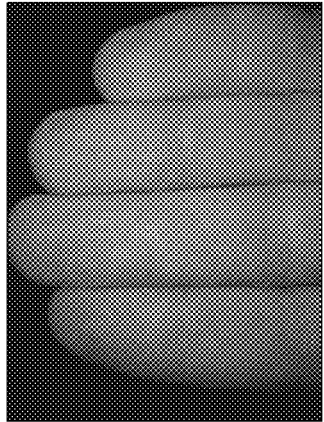
FIG. 6E
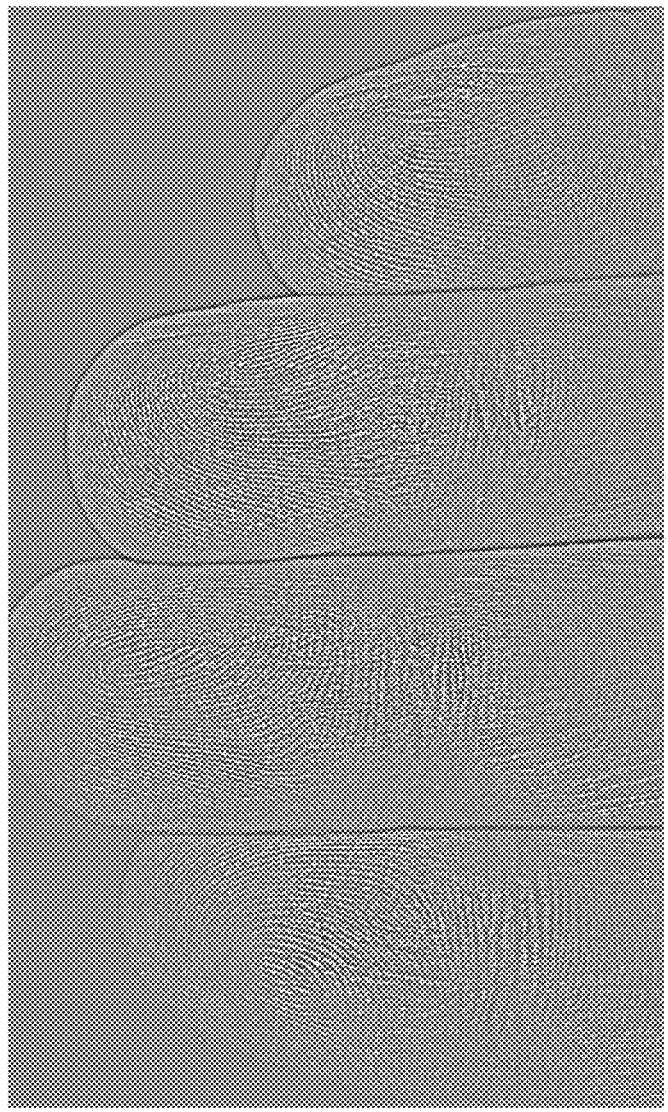

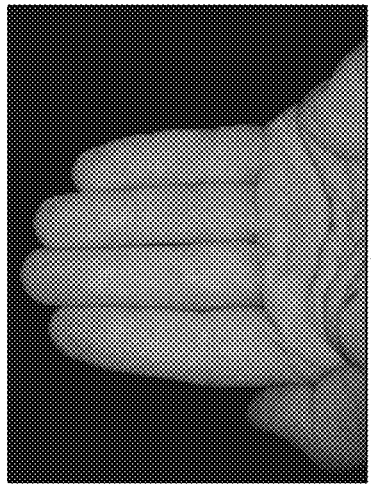
FIG. 6F
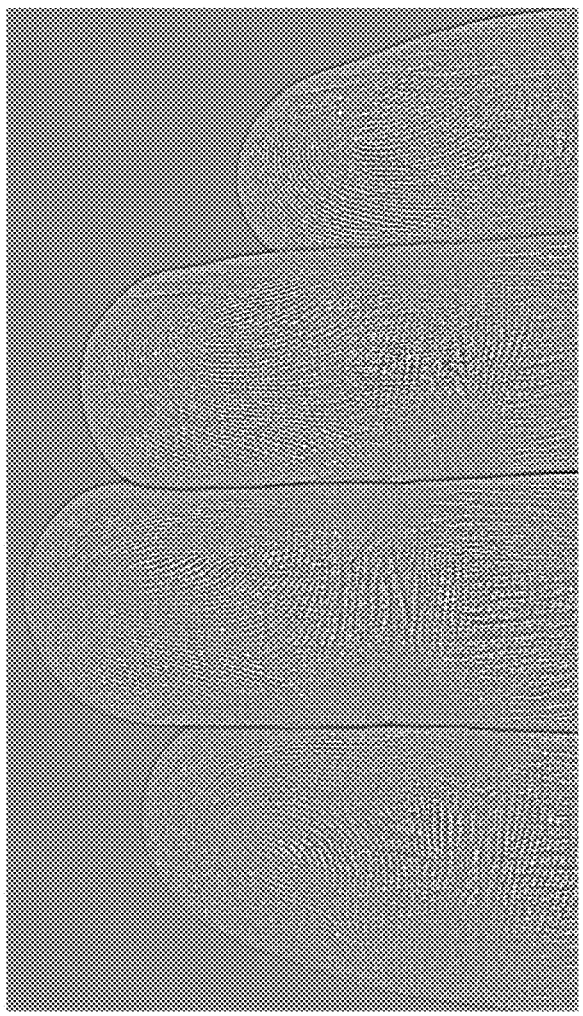

SYSTEMS AND METHODS FOR PERFORMING FINGERPRINT BASED USER AUTHENTICATION USING IMAGERY CAPTURED USING MOBILE DEVICES

CROSS-REFERENCE TO RELATED APPLICATIONS

The present application is a continuation of U.S. Non-Provisional patent application Ser. No. 15/212,335, entitled "SYSTEMS AND METHODS FOR PERFORMING FINGERPRINT BASED USER AUTHENTICATION USING IMAGERY CAPTURED USING MOBILE DEVICES", filed on Jul. 18, 2016, which is a continuation of U.S. Non-Provisional patent application Ser. No.: 14/988,833, entitled "SYSTEMS AND METHODS FOR PERFORMING FINGERPRINT BASED USER AUTHENTICATION USING IMAGERY CAPTURED USING MOBILE DEVICES", filed Jan. 6, 2016, which is a continuation in part of U.S. Non-Provisional patent application Ser. No.: 14/819,639, entitled "SYSTEMS AND METHODS FOR PERFORMING FINGERPRINT BASED USER AUTHENTICATION USING IMAGERY CAPTURED USING MOBILE DEVICES", filed Aug. 6, 2015, which is based on and claims priority to U.S. Provisional Patent Application Ser. No.: 62/112,961, entitled "SYSTEMS AND METHODS FOR PERFORMING FINGERPRINT BASED USER AUTHENTICATION USING IMAGERY CAPTURED USING MOBILE DEVICES", filed Feb. 6, 2015, the contents of which is hereby incorporated by reference as if set forth expressly in its entirety herein.

TECHNICAL FIELD OF THE INVENTION

The present invention relates to systems and methods for capturing and characterizing biometric features, in particular, systems and methods for capturing and characterizing biometric features using images of fingers captured by an embedded camera of a mobile device such as a smartphone.

BACKGROUND OF THE INVENTION

As a biometric is a biological characteristic (such as a fingerprint, the geometry of a hand, retina pattern, iris texture, etc.) of an individual, biometric techniques can be used as an additional verification factor since biometrics are usually more difficult to obtain than other non-biometric credentials. Biometrics can be used for identification and/or authentication (also referred to as identity assertion and/or verification).

Biometric identity assertion can require a certain level of security as dictated by the application. For example, authentication in connection with a financial transaction or gaining access to a secure location requires higher security levels. As a result, preferably, the accuracy of the biometric representation of a user is sufficient to ensure that the user is accurately authenticated and security is maintained.

Moreover, missing, swapping, mixing, and illegal adoption of newborns is a global challenge and using automated biometric systems has been proposed to identify new borns based on their face, iris, fingerprint, footprint, and/or palmprint.

However, to the extent iris, face, finger, and voice identity assertion systems exist and provide the requisite level of accuracy, such systems require dedicated devices and applications and are not easily implemented on conventional smartphones, which have limited camera resolution and light emitting capabilities.

Electronic fingerprint sensors have already been added to smartphone devices, the iPhone 6 smartphone by Apple Inc. of Cupertino Calif. and the Samsung S5 smartphone by Samsung Co. of Samsung Korea are examples of this. In these devices, the user must enroll their fingerprint data by placing their finger on the sensor, at a later date the user may verify their identity by repositioning their finger on the sensor, the fingerprint data is compared with the enrollment data and if it matches the identity of the user is confirmed. Should the fingerprint not match then the user can be identified as an imposter. A disadvantage of these systems is that the fingerprint sensor adds size weight and cost to the device. Furthermore, for these reasons it is advantageous to minimize the size of the fingerprint sensor, and as such the fingerprint sensor typically captures only a portion of the fingerprint which reduces the effectiveness of the identification. The smaller the region of capture for the fingerprint sensor, the more chance there is that another finger will match by chance, and the more likely that any error in the fingerprint data will cause a false rejection of the authentic user.

Moreover, Capturing newborns' fingerprints by using the traditional fingerprint sensors is challenging because of the size of the finger and the difficulty of holding the newborn hand and placing it on the sensor.

In practical terms this means that the users (i.e., adults and newborns) suffer a higher level of inconvenience from false rejections, and the application of the sensor is limited to non-critical usage such as low value payments. Fingerprint sensors may also be subject of spoof attacks, where for example a mold of the authentic users fingerprint is placed in the fingerprint sensor to enable an imposter to pass authentication. This provides a further reason to restrict usage to non-critical applications.

A further challenge is that only a few mobile devices are equipped with fingerprint sensors which limits the numbers of people who have access to fingerprint authorization systems, and causes an inconsistency in authentication method between devices.

Systems have been proposed that analysis the image of a single finger using the camera of a mobile device, these systems are potentially more convenient, however, the lowest false accept rates and false reject rates for such systems for imaging and analyzing a single finger are still not reliable enough for applications requiring higher security such as medium to high value purchases and enterprises systems (i.e., large scale systems).

As such there is a need for a more reliable, and more ubiquitous finger recognition system.

SUMMARY OF THE INVENTION

Technologies are presented herein in support of a system and method for performing fingerprint recognition.

According to a first aspect, a method for performing fingerprint recognition is provided. The method includes the step of capturing, by a mobile device having a camera, a storage medium, instructions stored on the storage medium, and a processor configured by executing the instructions, one or more images depicting a plurality of fingers of a subject. The method also includes detecting, using a finger detection algorithm a plurality of fingers depicted in the one or images. The method also includes identifying, from the from one or more of the images according to a segmentation algorithm, a respective fingertip segment for each finger among the plurality of fingers. In addition, the method includes extracting discriminatory features for each of the identified fingers, generating a biometric identifier based on the extracted discriminatory features and storing the biometric identifier in the memory.

These and other aspects, features, and advantages can be appreciated from the accompanying description of certain embodiments of the invention and the accompanying drawing figures and claims.

BRIEF DESCRIPTION OF THE DRAWINGS

FIG. 6E depicts a captured image of fingers and corresponding ridge reflectivity image generated in accordance with at least one embodiment disclosed herein; and FIG. 6F depicts a captured image of fingers and corresponding ridge reflectivity image generated in accordance with at least one embodiment disclosed herein.

DETAILED DESCRIPTION OF CERTAIN EMBODIMENTS OF THE INVENTION

Figure 1:
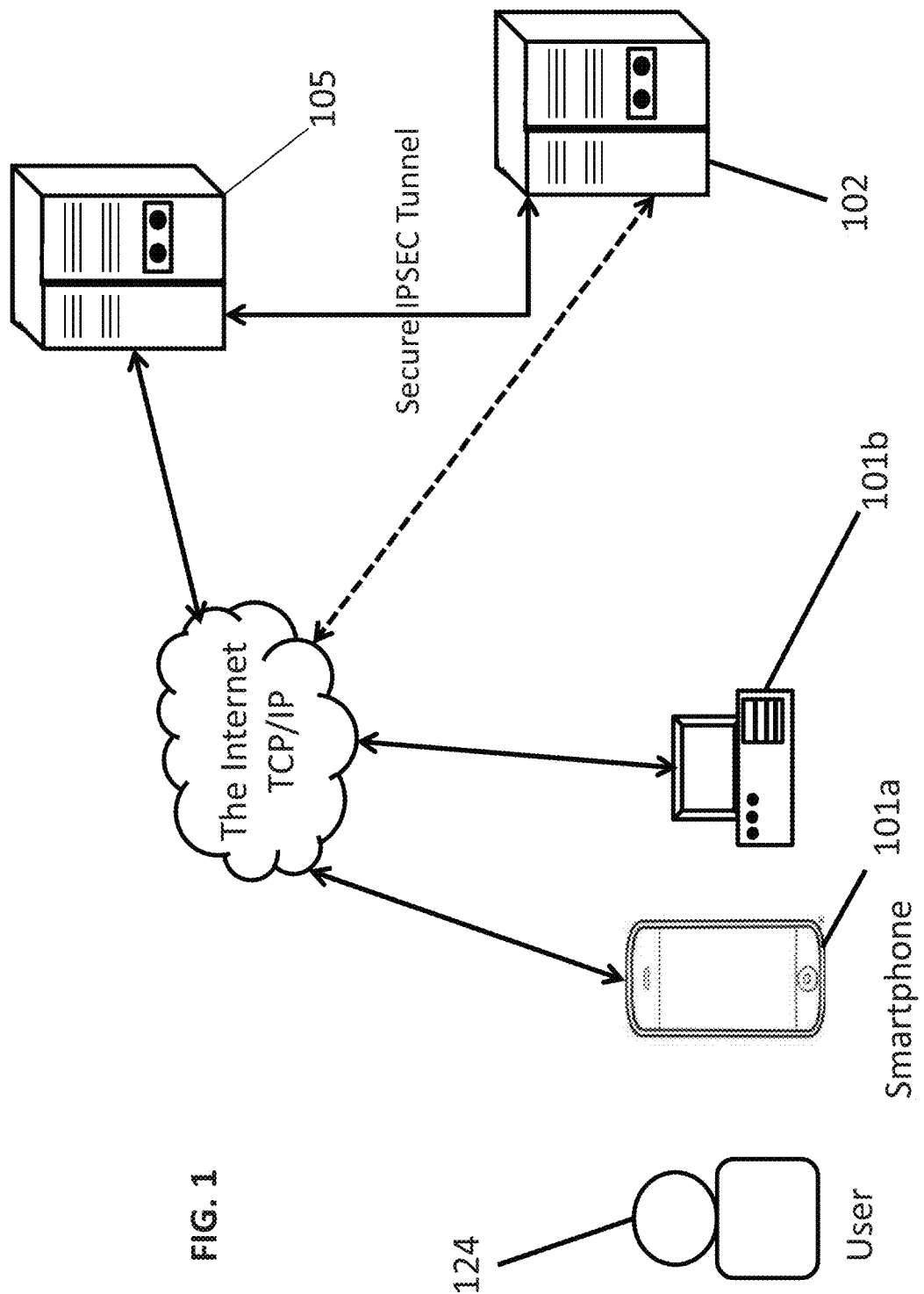
FIG. 1 is a high-level diagram of a computer system for authenticating a user according to the user's biometric features in accordance with at least one embodiment disclosed herein.

By way of example only and for the purpose of overview and introduction, embodiments of the present invention are described below which concern a system and method for capturing a user's biometric features and generating an identifier characterizing the user's biometric features using a mobile device such as a smartphone. The biometric identifier is preferably generated using imagery captured of a plurality of fingers of a user for the purposes of authenticating/identifying the user according to the captured biometrics and determining the user's liveness. The present disclosure also describes additional techniques for preventing erroneous authentication caused by spoofing. In some examples, the anti-spoofing techniques may include capturing one or more images of a user's biometrics and analyzing the captured images for indications of liveness.

In some implementations, the system includes a cloud based system server platform that communicates with fixed PC's, servers, and devices such as laptops, tablets and smartphones operated by users. As the user attempts to access a networked environment that is access controlled, for example, a website which requires a secure login, the user is prompted to authenticate using the user's preregistered mobile device. Authentication can include verifying the user's identity and/or verifying that the user is alive (e.g., determining liveness) by capturing biometric information in the form of at least images of the user's fingers, extracting unique features and encoding the features as a biometric identifier that is indicative of the user's biometric features and/or liveness using the mobile device. Accordingly, the users identity and/or liveness can be verified by the mobile device and/or the system server or a combination of the foregoing by analyzing the imagery, the generated biometric identifier and/or comparing the imagery and/or biometric identifier to a biometric identifier generated during the user's initial enrollment with the system.

According to an aspect of the subject application, the disclosed embodiments provide a reliable means of user identification/authentication using finger based biometric recognition on mobile devices that are ubiquitous and convenient to use. The disclosed embodiments perform four-finger based recognition using cameras that are typically present on mobile devices, so that no additional volume, cost, or weight is incurred on the design, and usage can be ubiquitous. A further aim of the system is to provide a defense against spoof attacks.

The present invention captures biometric information from multiple fingers simultaneously, and captures large print areas from each finger. Furthermore, the present invention may also be used to capture print information from other regions of the hand, including palm prints and hand prints to further increase the reliability of the system. Also, in the case of newborns identification, the present invention may be used to capture the toes. Moreover, the proposed innovation can be combined with existing mobile face recognition systems. By way of non-limiting example, exemplary systems and methods for biometrics based user authentication from imagery of facial features are described herein and in co-pending and commonly assigned U.S. patent application Ser. No. 14/668,352, entitled "SYSTEM AND METHOD FOR AUTHORIZING ACCESS TO ACCESS CON- TROLLED ENVIRONMENTS" filed May 13, 2015 which is a continuation of U.S. patent Ser. No. 9/003,196, entitled "SYSTEM AND METHOD FOR AUTHORIZING ACCESS TO ACCESS CONTROLLED ENVIRONMENTS" filed May 13, 2014; and U.S. Pat. No. 9,208,492, entitled "SYSTEMS AND METHODS FOR BIOMETRIC AUTHENTICATION OF TRANSACTIONS" filed on Mar. 7, 2014, which are hereby incorporated by reference as if set forth in their respective entireties herein. Further, the present invention may be used to process the acquired finger photo using the camera presented on mobile devices in order to generate a fingerprint images that correspond to acquired finger photos and that can be matched with the rolled and plain fingerprint images that are used in the Integrated Automated Fingerprint Identification Systems (IAFIS). IAFIS is a national automated fingerprint identification and criminal history system maintained by the Federal Bureau of Investigation (FBI). IAFIS provides automated fingerprint search capabilities, latent searching capability, electronic image storage, and electronic exchange of fingerprints and responses.

Disclosed embodiments can be referred as a multimodal biometric authentication system. Hence, the presence of multiple, independent pieces of biometrics (i.e., 4-10 fingers) offers the following advantages over the single finger mobile recognition systems either using finger images or fingerprint captured by embedded sensors in smartphones.
1. Performance: A combination of uncorrelated modalities (e.g., four fingers of a person and ten fingers of a newborn) can result in a better improvement in performance than a single finger recognition system. This accuracy improvement happens due to two reasons. First, the fusion of biometric evidences from different fingers effectively increases the discriminatory features and reduces the overlap between the features of different users. In other words, a combination of multiple fingers is more discriminative to an individual than a single finger. Second, the noise (caused by factors like dirt or ink smudge) and imprecision during the acquisition of a subset of the fingers can be addressed by the information provided by the remaining fingers.
2. Universality: Solve the non-universality problem and reduce the failure to enroll errors. For example, if a person cannot enroll a particular finger due to an amputated finger, a finger cut, injury, or worn-out ridges (i.e., the worn-out ridges can physically occur in one or more fingers of subjects), he can still be identified using his other fingers.
3. Spoof attack: Using the disclosed embodiments, in which enrolling multiple fingers of a user is performed, will improve the resistance of authentication systems to spoof attacks. This is because it becomes increasingly difficult to circumvent or spoof multiple fingers simultaneously.

An exemplary system for authenticating a user and/or determining the user's liveness according to imagery of the user's biometric features 100 is shown as a block diagram in FIG. 1. In one arrangement, the system consists of a system server 105 and user devices including a mobile device 101a and a user computing device 101b. The system 100 can also include one or more remote computing devices 102.

The system server 105 can be practically any computing device and/or data processing apparatus capable of communicating with the user devices and remote computing devices and receiving, transmitting and storing electronic information and processing requests as further described herein. Similarly, the remote computing device 102 can be practically any computing device and/or data processing apparatus capable of communicating with the system server and/or the user devices and receiving, transmitting and storing electronic information and processing requests as further described herein. It should also be understood that the system server and/or remote computing device can be a number of networked or cloud based computing devices.

In some implementations, computing device 102 can be associated with an enterprise organization, for example, a bank or a website, that maintain user accounts ("enterprise accounts") and provide services to enterprise account holders and require authentication of the user prior to providing the user access to such systems and services.

The user devices, mobile device 101a and user computing device 101b, can be configured to communicate with one another, the system server 105 and/or remote computing device 102, transmitting electronic information thereto and receiving electronic information therefrom as further described herein. The user devices can also be configured to receive user inputs as well as capture and process biometric information, for example, digital images and voice recordings of a user 124.

The mobile device 101a can be any mobile computing devices and/or data processing apparatus capable of embodying the systems and/or methods described herein, including but not limited to a personal computer, tablet computer, personal digital assistant, mobile electronic device, cellular telephone or smart phone device and the like. The computing device 101b is intended to represent various forms of computing devices that a user can interact with, such as workstations, a personal computer, laptop computer, dedicated point-of-sale systems, ATM terminals, access control devices or other appropriate digital computers.

As further described herein, the system 100, facilitates the authentication of a user 124 according to a user's biometric features using a mobile device 101a. In some implementations, identification and/or authentication according to a user's biometric features utilizes a user's biometric information in a two stage process. The first stage is referred to as enrollment. In the enrollment stage samples (e.g., images) of appropriate biometric(s) is/are collected from an individual. These samples of biometrics are analyzed and processed to extract features (or characteristics) present in each sample. The set of features present in the imaged biometric of an individual constitutes an identifier for the person and are useable to authenticate the user and in some implementations determine whether the user is a live subject. These identifiers are then stored to complete the enrolment stage. In the second stage the same biometric of the individual is measured. Features from this biometric are extracted just like in the enrollment phase to obtain a current biometric identifier. If the goal is determining liveness, the features or characteristics can be analyzed to determine if they are representative of a live subject. As further described herein, other features and characteristics of the captured imagery of the biometrics can be analyzed to determine liveness. If the goal is identification, then this identifier is searched for in the database of identifiers generated in the first phase. If a match occurs, the identification of the individual is revealed, otherwise identification fails. If the goal is authentication, then the identifier generated in the second stage is compared with the identifier generated in the first stage for the particular person. If a match occurs, authentication is successful, otherwise authentication fails.

It should be noted that while FIG. 1 depicts the system for authenticating a user 100 with respect to a mobile device 101a and a user computing device 101b and a remote computing device 102, it should be understood that any number of such devices can interact with the system in the manner described herein. It should also be noted that while FIG. 1 depicts a system for authenticating a user 100 with respect to the user 124, it should be understood that any number of users can interact with the system in the manner described herein.

It should be further understood that while the various computing devices and machines referenced herein, including but not limited to mobile device 101a and system server 105 and remote computing device 102 are referred to herein as individual/single devices and/or machines, in certain implementations the referenced devices and machines, and their associated and/or accompanying operations, features, and/or functionalities can be combined or arranged or otherwise employed across a number of such devices and/or machines, such as over a network connection or wired connection, as is known to those of skill in the art.

It should also be understood that the exemplary systems and methods described herein in the context of the mobile device 101a (also referred to as a smartphone) are not specifically limited to the mobile device and can be implemented using other enabled computing devices (e.g., the user computing device 102b).

Figure 2A:
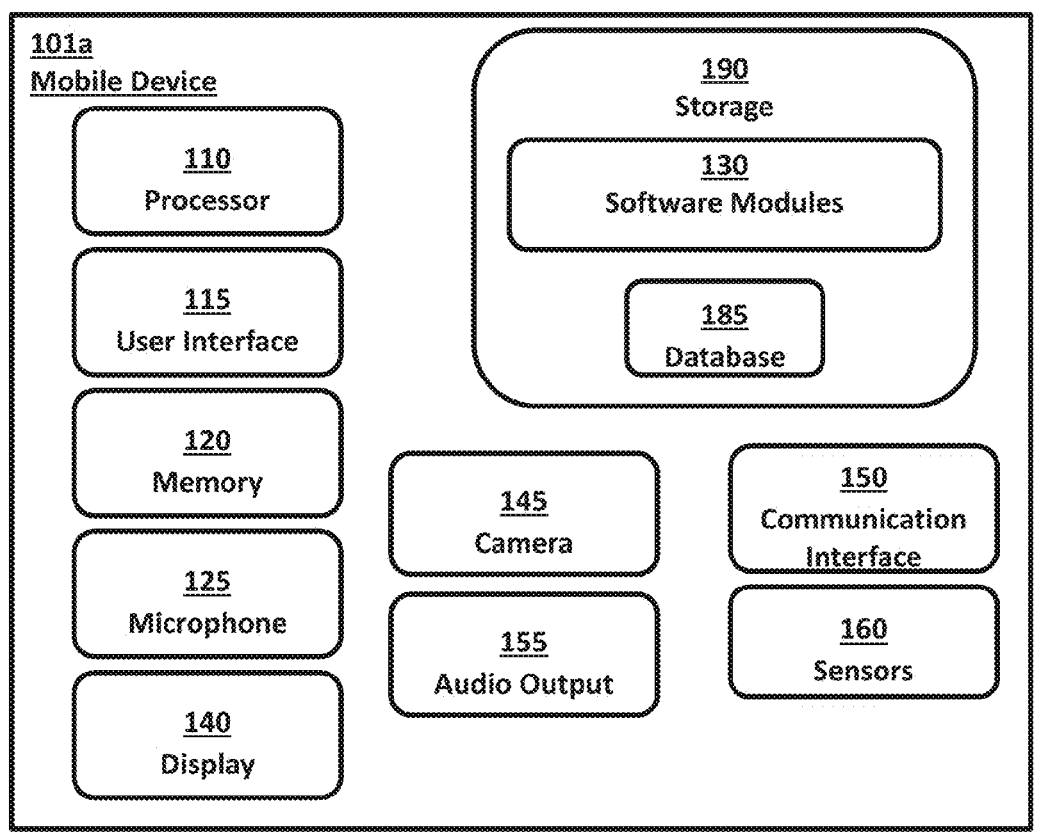
FIG. 2A is a block diagram of a computer system for authenticating a user according to the user's biometric features in accordance with at least one embodiment disclosed herein.

In reference to FIG. 2A, mobile device 101a of the system 100, includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the mobile device and its various hardware components to carry out operations for aspects of the systems and methods as will be described in greater detail below. Memory can be, for example, a random access memory (RAM) or any other suitable volatile or non-volatile computer readable storage medium. In addition, the memory can be fixed or removable. The storage 190 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 2B:
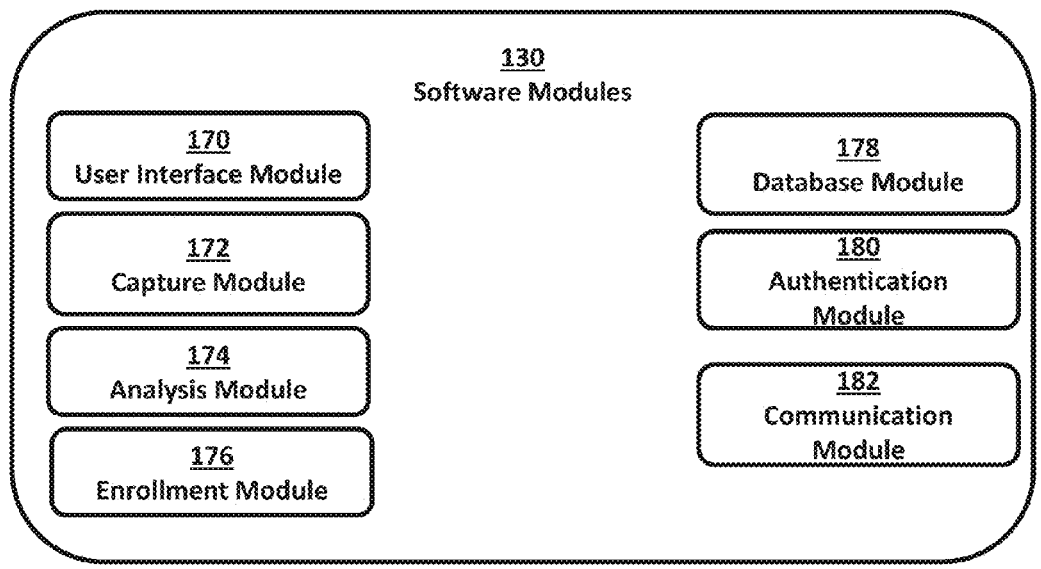
FIG. 2B is a block diagram of software modules for authenticating a user according to the user's biometric features in accordance with at least one embodiment disclosed herein.

One or more software modules 130 are encoded in the storage 190 and/or in the memory 120. The software modules 130 can comprise one or more software programs or applications having computer program code or a set of instructions (also referred to as the "mobile authentication client application") executed in the processor 110. As depicted in FIG. 2B, preferably, included among the software modules 130 is a user interface module 170, a biometric capture module 172, an analysis module 174, an enrollment module 176, a database module 178, an authentication module 180 and a communication module 182 that are executed by processor 110. Such computer program code or instructions configure the processor 110 to carry out operations of the systems and methods disclosed herein and can be written in any combination of one or more programming languages.

The program code can execute entirely on mobile device 101, as a stand-alone software package, partly on mobile device, partly on system server 105, or entirely on system server or another remote computer/device. In the latter scenario, the remote computer can be connected to mobile device 101 through any type of network, including a local area network (LAN) or a wide area network (WAN), mobile communications network, cellular network, or the connection can be made to an external computer (for example, through the Internet using an Internet Service Provider).

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150 for use within the system 100. In addition, it should be noted that other information and/or data relevant to the operation of the present systems and methods (such as database 185) can also be stored on storage. Preferably, such information is stored on an encrypted data-store that is specifically allocated so as to securely store information collected or generated by the processor executing the secure authentication application. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device 101a and/or system server 105 can be encrypted using a user's biometric information, liveness information, or mobile device information as an encryption key. In some implementations, a combination of the foregoing can be used to create a complex unique key for the user that can be encrypted on the mobile device using Elliptic Curve Cryptography, preferably at least 384 bits in length. In addition, that key can be used to secure the user data stored on the mobile device and/or the system server.

Also preferably stored on storage 190 is database 185. As will be described in greater detail below, the database contains and/or maintains various data items and elements that are utilized throughout the various operations of the system and method for authenticating a user 100. The information stored in database can include but is not limited to user biometric templates and profile information, as will be described in greater detail herein. It should be noted that although database is depicted as being configured locally to mobile device 101a, in certain implementations the database and/or various of the data elements stored therein can, in addition or alternatively, be located remotely (such as on a remote device 102 or system server 105—not shown) and connected to mobile device through a network in a manner known to those of ordinary skill in the art.

A user interface 115 is also operatively connected to the processor. The interface can be one or more input or output device(s) such as switch(es), button(s), key(s), a touch-screen, microphone, etc. as would be understood in the art of electronic computing devices. User Interface serves to facilitate the capture of commands from the user such as an on-off commands or user information and settings related to operation of the system for authenticating a user 100. For example, interface serves to facilitate the capture of certain information from the mobile device 101 such as personal user information for enrolling with the system so as to create a user profile.

The computing device 101a can also include a display 140 which is also operatively connected to processor the processor 110. The display includes a screen or any other such presentation device which enables the system to instruct or otherwise provide feedback to the user regarding the operation of the system for authenticating a user 100. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed or user entered information can be captured and stored in the memory.

Mobile device 101a also includes a camera 145 capable of capturing digital images. The camera can be one or more imaging devices configured to capture images of at least a portion of the user's body including the user's eyes and/or face while utilizing the mobile device 101a. The camera serves to facilitate the capture of images of the user for the purpose of image analysis by the mobile device processor 110 executing the secure authentication client application which includes identifying biometric features for (biometrically) authenticating the user from the images and determining the user's liveness. The mobile device 101a and/or the camera 145 can also include one or more light or signal emitters (e.g., LEDs, not shown) for example, a visible light emitter and/or infra-red light emitter and the like. The camera can be integrated into the mobile device, such as a front-facing camera or rear facing camera that incorporates a sensor, for example and without limitation a CCD or CMOS sensor. As would be understood by those in the art, camera 145 can also include additional hardware such as lenses, light meters (e.g., lux meters) and other conventional hardware and software features that are useable to adjust image capture settings such as zoom, focus, aperture, exposure, shutter speed and the like. Alternatively, the camera can be external to the mobile device 101a. The possible variations of the camera and light emitters would be understood by those skilled in the art. In addition, the mobile device can also include one or more microphones 104 for capturing audio recordings as would be understood by those skilled in the art.

Audio output 155 is also operatively connected to the processor 110. Audio output can be any type of speaker system that is configured to play electronic audio files as would be understood by those skilled in the art. Audio output can be integrated into the mobile device 101 or external to the mobile device 101.

Various hardware devices/sensors 160 are also operatively connected to the processor. The sensors 160 can include: an on-board clock to track time of day, etc.; a GPS enabled device to determine a location of the mobile device; an accelerometer to track the orientation and acceleration of the mobile device; Gravity magnetometer to detect the Earth's magnetic field to determine the 3-dimensional orientation of the mobile device; proximity sensors to detect a distance between the mobile device and other objects; RF radiation sensors to detect the RF radiation levels; and other such devices as would be understood by those skilled in the art.

Communication interface 150 is also operatively connected to the processor 110 and can be any interface that enables communication between the mobile device 101a and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

At various points during the operation of the system for authenticating a user 100, the mobile device 101a can communicate with one or more computing devices, such as system server 105, user computing device 101b and/or remote computing device 102. Such computing devices transmit and/or receive data to/from mobile device 101a, thereby preferably initiating maintaining, and/or enhancing the operation of the system 100, as will be described in greater detail below.

Figure 2C:
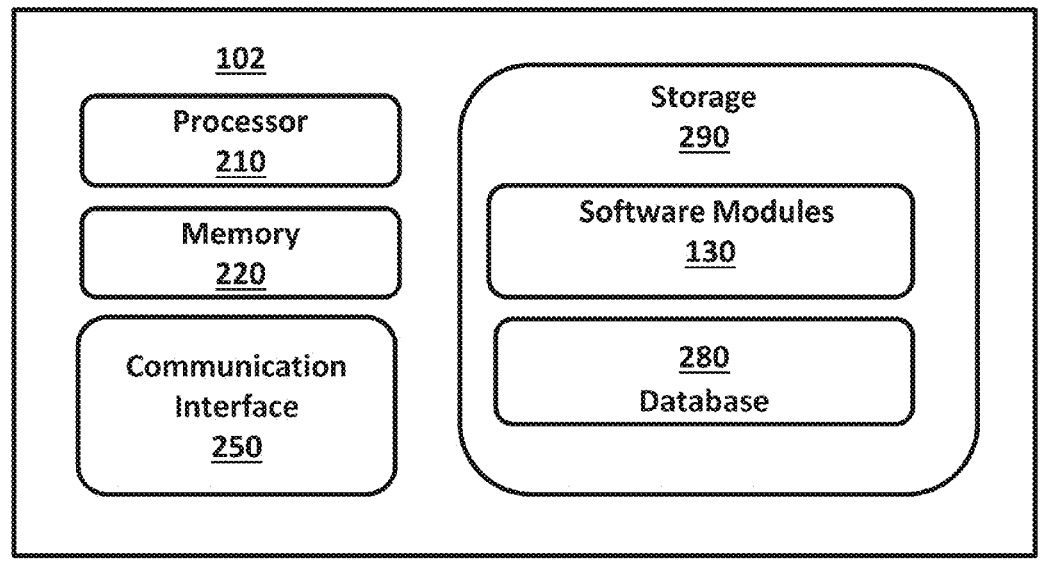
FIG. 2C is a block diagram of a computer system for authenticating a user according to the user's biometric features in accordance with at least one embodiment disclosed herein.

FIG. 2C is a block diagram illustrating an exemplary configuration of system server 105. System server 105 can include a processor 210 which is operatively connected to various hardware and software components that serve to enable operation of the system for authentication of a user 100. The processor 210 serves to execute instructions to perform various operations relating to user authentication and transaction processing as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more of the software modules 130 are encoded in the storage 290 and/or in the memory 220. One or more of the software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, mobile device 101*a* and/or user computing device 101*b*, or entirely on such remote computing devices. As depicted in FIG. 2B, preferably, included among the software modules 130 are an analysis module 274, an enrollment module 276, an authentication module 280, a database module 278, and a communication module 282, that are executed by the system server's processor 210.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface 255 can be any interface that enables communication between the system server 105 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

The operation of the system for authenticating a user 100 and the various elements and components described above will be further appreciated with reference to the method for facilitating the capture of biometric information and authentication as described below. The processes depicted herein are shown from the perspective of the mobile device 101*a* and/or the system server 105, however, it should be understood that the processes can be performed, in whole or in part, by the mobile device 101*a*, the system server 105 and/or other computing devices (e.g., remote computing device 102 and/or user computing device 101*b*) or any combination of the foregoing. It should be appreciated that more or fewer operations can be performed than shown in the figures and described herein. These operations can also be performed in a different order than those described herein. It should also be understood that one or more of the steps can be performed by the mobile device 101*a* and/or on other computing devices (e.g. computing device 101*b*, system server 105 and remote computing device 102).

Figure 3:
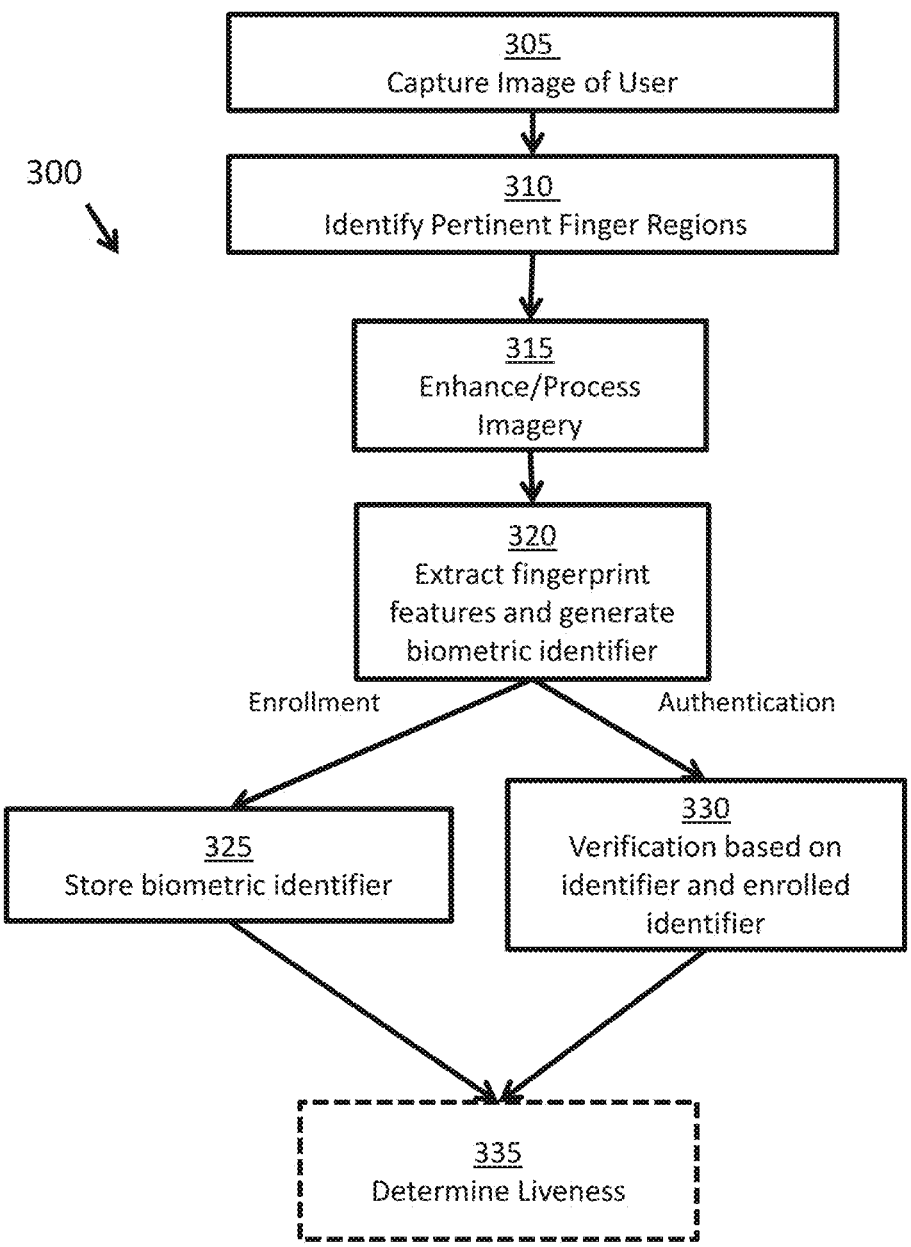
FIG. 3 is a flow diagram showing a routine for generating a biometric identifier according to the user's biometric features and enrolling or authenticating the user in accordance with at least one embodiment disclosed herein.

Turning now to FIG. 3, a flow diagram illustrates a routine 300 for detecting the user's biometric features from one or more images in accordance with at least one embodiment disclosed herein. In general, the routine includes capturing and analyzing one or more images of at least multiple fingers of a user. Preferably four fingers are captured, however more or less fingers can be captured and analyzed as described herein. As noted above, the capture process can be performed during enrollment of a user, as well as during subsequent authentication sessions, which are also described in relation to FIG. 3.

It should be understood that, according to the disclosed embodiments, the images can be captured and the biometric identifier that is indicative of the user's unique biometric features and/or liveness can be generated using mobile devices (e.g. mobile device 101*a*) that are widely available and having digital cameras 145 capable of capturing images of the user's fingers in at least the visible spectral bands.

The process begins at step 305, where the mobile device processor 110 configured by executing one or more software modules 130, including, preferably, the capture module 172, causes the camera 145 to capture one or more images of at least a portion of the user's (124) capturing all four (4) fingers of one hand. Preferably the camera captures high resolution imagery, for example using a rear facing camera of a conventional smartphone device. If available, the imagery can be captured with flash illumination for increased detail.

In some implementations, during the capture process, the user is prompted to position their fingers in front of the camera. During this procedure the user can be given visual feedback from the camera on the device display so that the users can position their fingers appropriately. In some implementations, markings displayed on the display can be used to guide the users to place their fingers at a specific location in the camera's field of view, and at a particular distance away. For example the users could be asked to align their fingers with a four (4) finger outline overlaid on the camera image preview screen, accordingly, the users would know that their fingers are at an appropriate distance from the camera when they fill the fingers' outline on the camera preview. In some implementations, the users can hold their index, middle, ring and little fingers together rather than having them spaced apart. Then, in some implementations, the users could be asked to capture the thumb of each both hands separately. In some implementations, the user will be a new born who will be helped by an adult to capture images of the fingers. The focus of the camera can be set by the configured processor to focus on the fingers, which could be assumed to be the location of the on-screen finger position guide. In some implementations, a classifier will be trained to detect the fingers in images and this classifier can trigger the camera to capture the image once the fingers are detected and in focus. The classifier that may be used to detect fingers in images, in some implementation, can be Haar Cascade classifier that have been trained using regular Haar features or predefined and predesigned filters that are suitable for detecting fingers in hand images (as well as feet images, e.g., in the case of newborns identification systems). In some implementations, image enhancement procedures may be applied to the image before using a classifier to detect fingers in the captured images. In some implementation, image enhancement procedures that may be applied before applying finger classifier, may be designed to be a band pass filters that passes finger print ridges frequencies but minimize the out of focus background frequencies.

Then, the captured image can be examined, and the quality of the captured biometric sample will be determined by analyzing the fingers' ridges. This quality measure can be a fused measure of the following ridges properties: frequency, orientation, sharpness, and connectivity. If the quality measure was below a predetermined threshold, the user could be advised and guided to repeat the capture process again.

After the capture of the fingers, then at step 310, the regions of each finger will be identified. Then, at step 315, the regions are enhanced and at then, at step 320, the discriminatory feature space of each finger can be extracted independently and stored separately. More specifically, at step 310, the configured processor 110 can execute an automatic fingers detection algorithm to detect the fingers in the imagery. For example an exemplary finger detection algorithm can include the application of segmentation algorithms to distinguish the fingers from the background. This could be performed, for example, by dividing the image into homogeneous regions and then examining each region and classify it as finger or non-finger region. Moreover, this could be performed, for example, by using a classifier that detect and classify finger and finger tips. In some implementation, the classifiers that may be used to detect different fingers, classify them, and detect finger tips, can be trained Haar Cascade classifiers, HOG Cascade classifiers, LBP Cascade classifiers, or combination of these classifiers. Training of the classifiers could be performed on known example images as is known in the art. Note that a classifier trained to find the hand could first be used to narrow the search region for the other finger finding classifiers to improve speed and accuracy. Note also that such classifiers could be used in conjunction with other fingertip location finding techniques to provide improved accuracy. In some implementations, the regions that are identified using the classifier(s) can be highlighted by a border and displayed to the user on the mobile device display. For instance, a region identified as a fingertip segment can be bounded by a border in the image that highlights the identified region. The border can be various shapes including rectangular or elliptical borders and different segments can be highlighted including, fingertips, the hand, a group of fingers, other finger regions and the like. The users enrolment data could be used to help train the classifier once finger-tip positions have been confirmed by the user. For example, in some implementations, the process of capturing and detecting fingers and finger tips may be summarized in the following steps. (1) capture hand image, then (2) invoke a cascade classifier that is trained to find the first finger tip region, then another classifier that is trained to find the second finger tip region and so on.

By way of example and without limitation, use of a classifier (such as an LBP classifier) can be implemented to find the finger tips in the image, further to this it can also be advantageous to first use a classifier to find a major region of the hand such as the whole hand or the 4 fingers of the hand, then a secondary method to locate a minor region (such as the finger tips or intermediate phalanges) within the major region. The secondary method could be another classifier trained to locate each of the minor regions. The results of the minor classifier could further be filtered using a knowledge of the expected relationships (e.g., prescribed relationships between each minor region (for example the four (4) fingers when the hand is held flat with closed fingers have a known positional relationship that can be used to exclude false matches). Further filtering could be applied by finding the positions of other prominent hand features (such as the joins between the fingers), and using this information to filter the results from the classifier. Moreover, the major classifier could be used in real time to follow the fingers as the user presents them to the camera and ensure that focus, and exposure are optimized for the hand before automatically triggering image capture and/or biometric matching.

As previously noted and further described herein, the processor can be configured to detect and track the fingers in real-time as the user is presenting the fingers to the camera and imagery is being captured using the camera. The tracked position of the images can be used to detect when fingers are sufficiently positionally stable and improve the quality of the verification image and the reliability of finger recognition.

In some implementations, the processor can be configured to accelerate real time finger detection by dynamically switching between an object detection method and a faster, tracking method, such as template matching or optical flow. For instance, when a set of four finger tips have been detected, and they have been determined to represent a hand, the configured processor can track the fingers using an optical flow algorithm. As a result, the finger positions can be tracked with significantly lower latency, and higher frame rate, than if, for example, a Cascade Classifier was also applied to subsequent image frames. High speed can be achieved by restricting the search space in the image that is searched by the processor to local image regions and the processor can be configured to only match pixels that represent distinct features, such as the center of a finger.

If a finger displaces too far, or leaves the field of view, object tracking may fail. Upon detecting a failure by the processor, the processor can revert to the initial object detection method, say, a Cascasde classifier. In the case of tracking four fingers, the processor can measure the relative positions of the fingers (for example, distance between finger centers) and if the distance has been determined to have altered significantly (e.g., above a prescribed threshold value), the system can revert to object detection.

Preferably, the capture system is able to detect when a user's fingers are held stationary (within a certain tolerance) to prevent motion blur in the verification image. This can be achieved, for example, by tracking an object between frames (e.g., computing a vector of travel) and capturing the high-resolution verification image when the object's speed falls below a threshold velocity.

Small errors in locating an objects position can propagate into the calculation of a velocity vector. Methods such as Cascade Classifiers often introduce artificial fluctuations in an objects position from frame to frame (the objects centre 'jiggles'). This positional noise interferes with determining when an object is stationary. Tracking using optical flow, however, as described above, has lower noise and provides faster updates of an objects position, and can make stationary object detection significantly more reliable.

Furthermore, in some implementations, finger length information could be stored and used as part of the fingertip identification algorithm, some weight could be placed on the fact that the finger prints are expected at particular relative locations in the image, and this could improve the reliability of the finger print finding algorithm, and for example help to reject print matches that are made in error. The same is true for information about the height and width of each of the fingers. In addition, the color of the users skin could be stored on enrolment and used as a further biometric identification and/or liveness verification measures. This has the advantage that spoof prints which possess the correct print but not the correct skin tone can be rejected as spoofs (for example pink silicone molds, or black and white laser prints from recovered latent fingerprints).

Figure 4A:
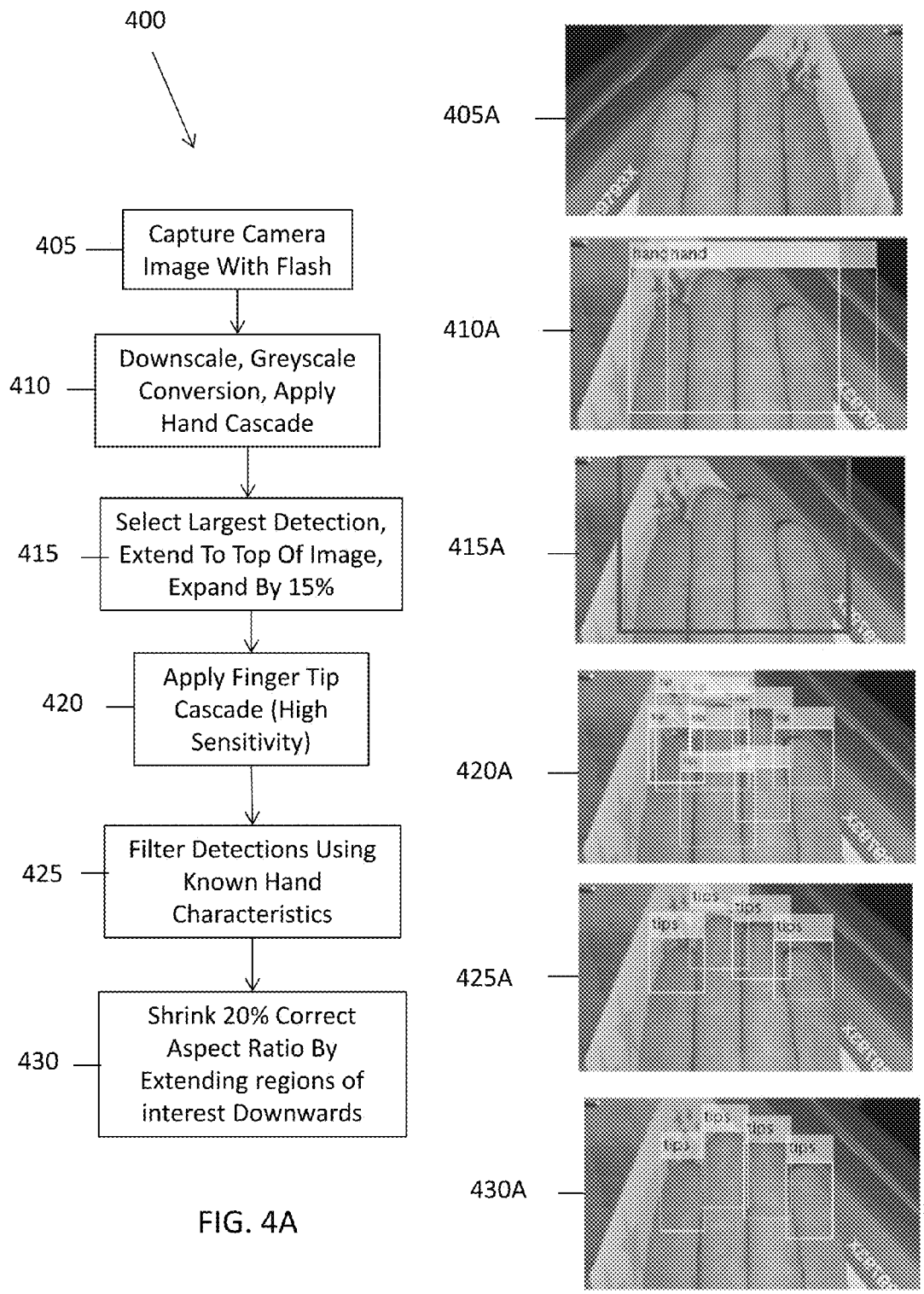
FIG. 4A is a flow diagram showing a routine for detecting fingers from visual imagery and corresponding images in accordance with at least one embodiment disclosed herein.
Figure 4B:
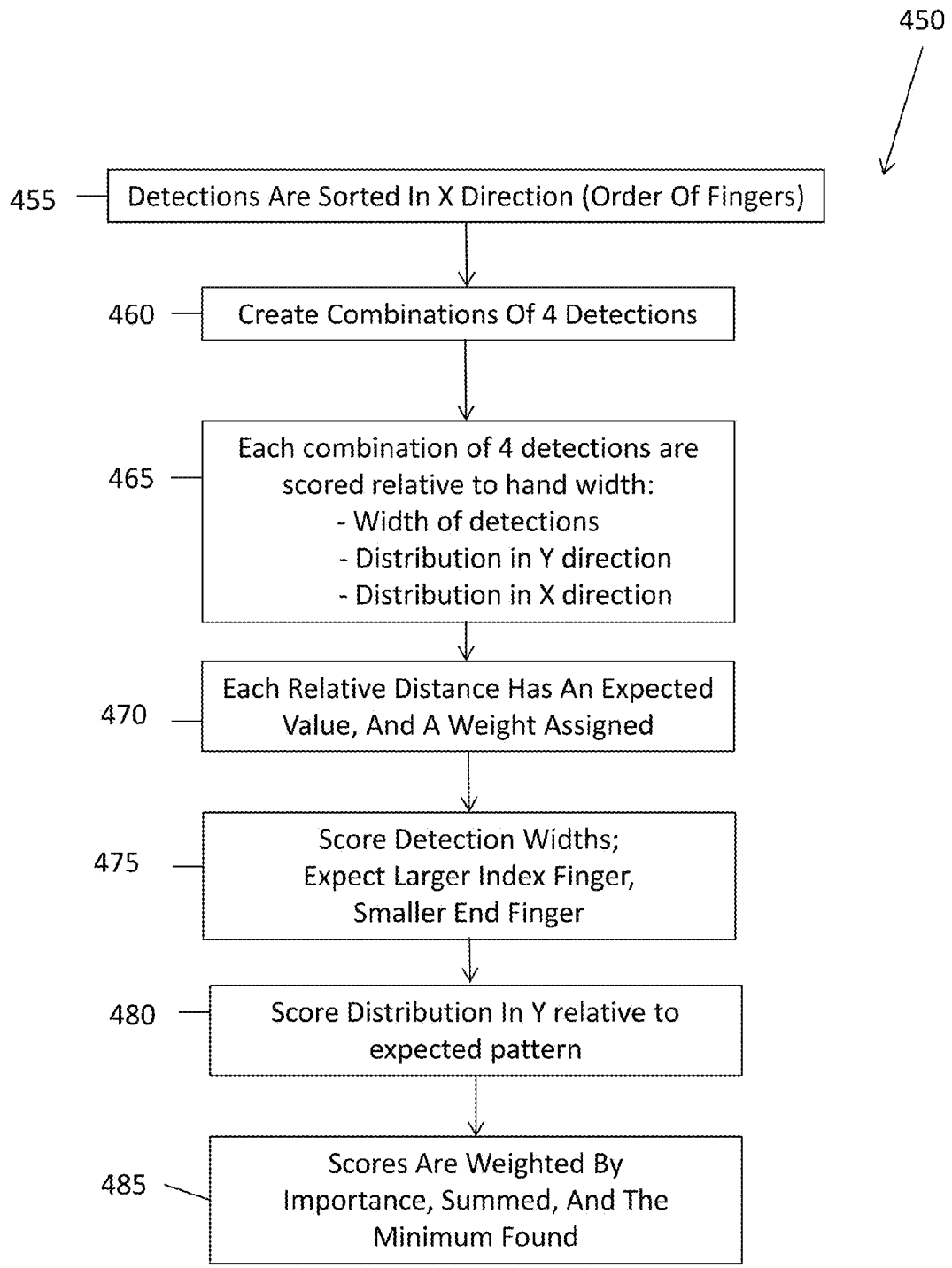
FIG. 4B is a flow diagram showing a routine for filtering fingertip regions detected within from visual imagery in accordance with at least one embodiment disclosed herein.
Figure 4C:
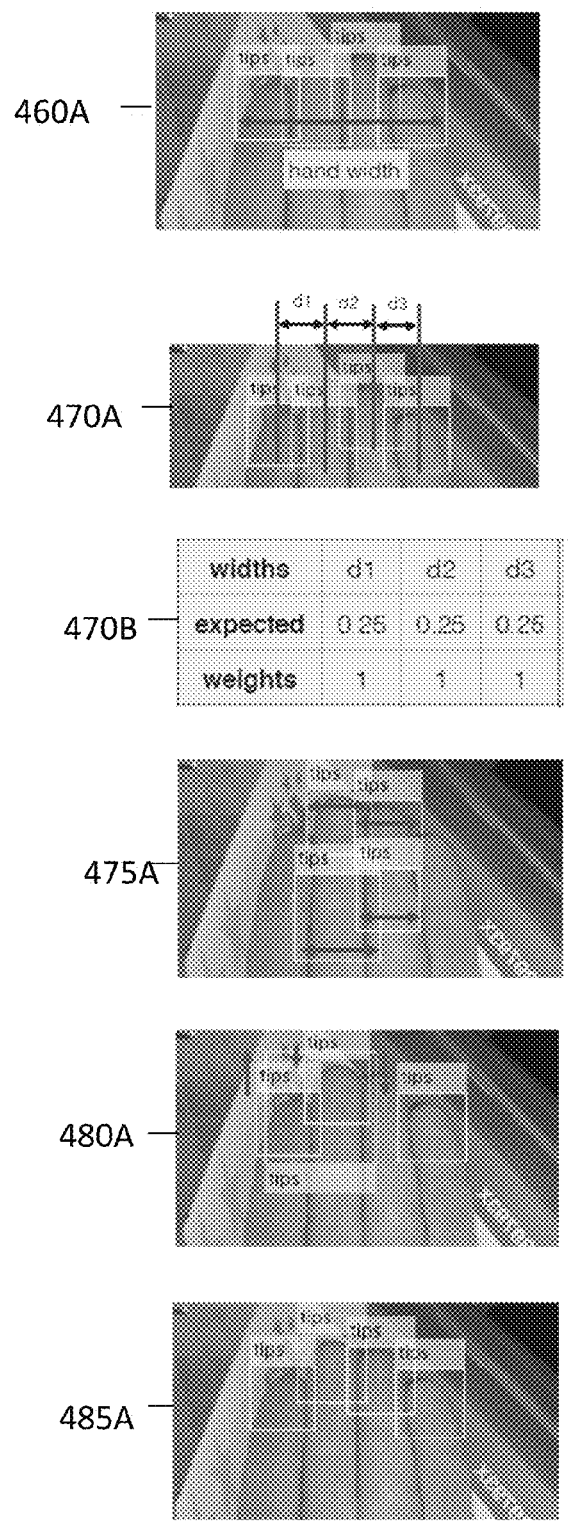
FIG. 4C depicts images captured and generated in accordance with the routine for filtering fingertip regions of FIG. 4B.

FIG. 4 depicts an exemplary routine 400 for fingertip detection from captured imagery of fingers and the corresponding imagery. As shown, at step 405 captured imagery including a plurality of fingers is obtained. The exemplary high-resolution image is shown as image 405a At step 410, the imagery is down-scaled/converted to greyscale imagery and a major cascade is applied to detect the hand within the image. The exemplary greyscale image and a plurality of borders depicted around the detected hand regions are depicted in image 410*a*. At step 415 the largest detected hand region is selected and the region is enlarged to include the surrounding area (e.g., an expanded region) further fingertip detection. The exemplary greyscale image and border depicted around the selected and expanded finger region is depicted in image 415*a*. Then at step 420, one or more higher sensitivity cascade classifiers are applied to detect minor regions, i.e., fingertip regions for each of the fingers. The exemplary greyscale image and borders depicted around a plurality of detected fingertip regions is depicted in image 420*a*. As shown, the detected fingertip regions can exceed the number of actual fingertips in the image. Then at step 425, the fingertip regions are filtered. Filtering is further described herein in relation to FIG. 4B. The exemplary grey scale image and borders depicted around the filtered detected fingertip regions are depicted in image 425*a*. Then at step 430, the fingertip regions of interest (ROI) are adjusted (e.g., resized or extended downwards) to correct aspect ratio. The exemplary greyscale image and borders depicted around the detected and resized ROIs are depicted in image 430*a*.

The finger detection is preferably robust to indoor and outdoor lighting, where images taken with illumination can be substantially different. For example, in low light environments the background often underexposes and becomes dark, while in strong, diffuse sunlight, background brightness can exceed that of the fingers and shading can be significantly different. Accordingly, in some implementations, the finger detection method can be improved by determining, by the mobile device processor, the amount of ambient light and, based on the detected light level, switching to a more optimal pathway for a particular light level in real time. Light levels, for example, could be read from a hardware based lux meter, such as that found on mobile phones for adjusting screen brightness, or estimated from camera exposure settings.

In one such implementation, one or more classifiers that are specific to respective light levels can be stored and available to the processor to perform finger segmentation. For instance a first Cascade classifier, that is used to detect one or more regions of the fingers, can be trained on images taken in high ambient light, while a second Cascade classifier is trained on images taken in low ambient light. Based on the measured light level, the configured mobile device processor can apply the appropriate classifier. More specifically, the first classifier can be used by the processor for detection as a default, unless light levels exceed a threshold, in which case the second classifier can be used. Switching between classifiers can occur in real time, for example, if a sequence of image frames having different ambient lighting levels is being captured and analyzed. It can also be appreciated that the foregoing method of applying ambient light-specific classifiers can be applied to images that are initially captured during the process (e.g., low resolution images captured while the user is positioning their fingers at the appropriate location in front of the camera) or subsequent high resolution image captures (e.g., high resolution images captured after the fingers are detected in the initial image captures and determined to be in focus).

Moreover, in some implementations, based on the measured light level, the configured mobile device processor can selectively implement artificial flash image pre-processing steps as further described below. For instance, when light levels are sufficiently high, the artificial flash process can be applied so as to avoid utilizing the flash bulb to illuminate the subject.

No single approach to finger detection is guaranteed to be 100% successful, however, the processor can be configured to calculate a metric for detection quality, and based on the metric, apply a series of detection methods until a result of high enough quality is achieved. For example, in the case of detecting all four fingers, the configured processor can compute a score to determine which set of four detections most likely represents a hand, as further described herein. If this score is poor (e.g., does not meet a prescribed threshold), or fingers are missing, the configured processor can apply further detections techniques. The further detection techniques can be in the form of a differently trained classifier, or some other unrelated approach. Moreover, in some implementations, the configured processor can estimate missing finger locations according to the users known hand metrics, for instance, as determined from previous enrollment or authentication captures. It can be appreciated that the particular order in which these approaches are applied does not have to be invariable, and the particular detection techniques that are implemented and the order of application can be selectively applied by the processor as a function of measured environmental conditions, hardware capabilities of the particular mobile device, or tailored over time to a specific user (e.g., based on training and/or machine learning algorithms). In view of the foregoing, it can be appreciated that, to improve speed of detection, the processor can be configured to apply tiered segmentation approach in which faster (and potentially less accurate) segmentation algorithms are first applied and, in the event the quality of the results are not sufficient, transition to more robust (and sometimes more processing intensive) segmentation algorithms to more accurately detect fingertip segments.

As noted above and further described herein, the exemplary finger-based recognition algorithms implemented by the mobile device processor can include one or more image enhancement steps to improve finger detection and feature extraction. Because detection methods such as Cascade Classifiers often function on greyscale images, therefore, color information is lost, for example, if only luma is used as an input. Accordingly, methods for detecting objects with known color characteristics, such as the human hand, can be beneficially improved by enhancing regions that represent the expected color prior to conversion to greyscale.

In one exemplary implementation, an image pre-processing method applicable to finger detection implemented by the processor includes Adaptive Skin Models. More specifically, the processor can be configured to analyze one or more of the captured images and locate a region of known skin tone, for example by detecting a hand within an image, and then a color model is computed. The image is then converted into HSV color space and a probability density function (PDF) is fitted to both the distribution of hue and saturation values of pixels within the predetermined skin region. The remaining pixels in the image are located within the PDF and a probability (p-value) is extracted representing the likelihood that a pixel represents skin. Preferably, the process is iterative in that all pixels that exceed a threshold p-value are used to refine the previous model, and the updated model is then applied, using the processor, to all pixels. In some implementations, by assuming skin regions are continuous, pixels with low p-values, but which are surrounded by pixels with high p-values, can also be included in the model. The process can be halted after a fixed number of iterations or when the number of skin pixels no long increases significantly (i.e., no longer increases a prescribed amount, convergence). The converged p-values can then either be used directly (converted to a greyscale image) as input for further detection algorithms or, in addition or alternatively, can be used to brighten skin regions in the image relative to background, non-skin regions (e.g., acting as an 'artificial flash').

In the case of fingers being presented to the mobile device camera in a relatively predetermined location (e.g., as guided using an on-screen guide), the processor can be configured to assume a particular region is highly likely to represent skin tone (for example, a centralized region of the hand in the guide). Accordingly, this assumed region can act as the initial region for building a skin model. In addition or alternatively, skin tone can be recorded when a user enrolls with system (e.g., completed without the use of a skin model).

FIG. 4B depicts an exemplary routine 450 for filtering detected fingertip regions/segments (i.e., step 425 of FIG. 4A). Filtering generally refers to selection of a best set of fingertip segments (i.e., select a fingertip segment for each fingers that is most likely to corresponds to the actual fingertip segment).

The process begins at step 455 in which the fingertip detections are sorted in the horizontal ("X") direction (e.g., arranged in a direction that is perpendicular to the orientation of the fingers according to the order of the fingers). Then at step 460, combinations of four fingertip regions are generated using the plurality of detected fingertip regions. The exemplary greyscale image and borders depicted around a combination of four detected fingertip regions are depicted in image 460a.

Then at steps 465-480, each of the combined sets of four fingertip regions are scored. The scoring includes analyzing the fingertip regions to determine physical characteristics of individual fingertip regions and/or multiple fingertip regions and comparing the measured characteristics to expected characteristics. As further described herein, the scoring can be based on a comparative analysis of the physical characteristics of one or more fingertip segments relative to other fingertip segments and, in addition or alternatively, relative to physical characteristics of the plurality of fingers such as the total width of the previously detected hand region (e.g., "hand width" as detected at step 415).

More specifically, in some implementations, the combined width of the detections in a set can be compared to the hand width and scored based on the comparison. In addition or alternatively the distribution of widths of the detections (e.g., the center to center distance between adjacent finger segments) can also be scored relative to an expected width-distribution of finger segments in view of the hand width. The expected width distribution can be determined as an average from a training set of previously identified fingers. The training sets and the set can be normalized according to hand width for accurate comparison. For example, image 470a, an exemplary greyscale image of four fingers, the borders depicted around a combination of four detected fingertip regions/segments and the measured middle-to-middle distance between the adjacent segments d1, d2, and d3.

In some implementations, each particular comparison can be assigned a weight, such that the calculated score is a function of the weights. For instance, less conclusive/important measures (e.g., measurements with lower precision or accuracy or having less reliability) can be discounted by being assigned a lower weight so as to not skew the overall results of the scoring. By example and without limitation, as the relative length of the little finger has higher variance between individuals, the influence of the measured distance in Y determined relating to the little finger can be 'down weighted' accordingly. Table 470b in FIG. 4B depicts exemplary widths, weights and expected widths used to score the relative distance characteristics. As shown in table 470b, an exemplary expected relative distance between adjacent fingers is ¼ of the total width of the four fingers and each is assigned a weight of 1.

At step 475, widths of the fingertip segments can also be scored relative to other fingertip segments. The comparison of finger widths can be based on expected relative widths of particular fingers. For example, index fingers are expected to be larger relative to the end fingers, accordingly, the relative width of the fingertip regions/segments can be scored according to such individual finger segment comparisons. The exemplary greyscale image of the fingers and four possible detected fingertip regions corresponding to the two middle fingers (index and middle finger) are depicted in image 475a.

Similarly, at step 480, the relative position of the fingertip regions in the Y direction can be scored according to expected length of the respective fingertip segments. For instance, the middle two fingers are generally expected to be higher in the Y direction relative to the end fingers and the fingertip segments can be scored according to such expected relative position characteristics. Accordingly, the distribution of height of the fingertip segments in the Y direction (i.e., the direction that is parallel to the orientation of the fingers) can be analyzed. More specifically, analyzing the distribution in Y includes analyzing the 'length pattern' of the fingers as depicted in 480a. That is, the index finger is expected to be shorter than the middle finger, the middle finger longer than the ring finger, and ring finger longer than the little finger. Hence the regions of interest for the subject should have positions that follow an 'up, down, down' pattern in Y, from index to little finger. The precise expected pattern can be determined as an average from a training set of previously identified fingers. It can be appreciated that the training set and the set of fingertip segments can be normalized according to respective finger and/or hand dimensions for accurate comparison of relative lengths and/or positions in Y. Accordingly, the processor can be configured to compute the distance in Y between top boundaries of the various regions/segments of interest, thereby giving three distances: index to middle, middle to ring, ring to little. The processor can then use the hand width to normalize the distances, making them comparable across different scales of hand. Thereafter the distances can be compared to the expected pattern and the combination of fingers can be scored as a function of the comparison. The exemplary greyscale image of the fingers and four possible detected fingertip regions being compared in the Y direction are depicted in image 480a. It can also be appreciated that the relative height, width, Y-position and X-position of fingertip regions can also be weighted according to importance and/or reliability.

In addition to the foregoing measures the configured processor can also score the combinations of fingertip segments according to illumination characteristics of the depicted fingertip segments. More specifically, it can be expected that the fingers appear with roughly equal illumination in the image. Accordingly, the configured processor can, for each combination of fingertip segments, measure the illumination across the combination of fingertip segments and score the variance in illumination. For speed and accuracy, only the pixel values at the center of each fingertip segment (for example, within a 10 by 16 rectangle) can be summed and the variance of the 4 summations determined. High variance implies that one or more of the fingertip segments are incorrectly positioned and a worse score can be assigned.

Then at step 485, the cumulative scores of the combinations of fingertip regions are weighted, summed and the best combination of segments is identified according to the calculated score. The exemplary greyscale image of the fingers and the borders depicted around the best scoring combination of four detected fingertip regions are depicted in image 485a.

Further, in some implementations, the examination can be performed by analyzing the frequencies and orientations of edges within each region. In addition or alternatively, the segment of the image containing the fingers can be identified as the segment(s) that primarily fill the location of the on-screen finger positioning guide.

In some implementation, in the case of using for example only four (4) fingers for identification, A robust procedure for enrolling and verifying the four (4) finger prints could run as follows: a). Guide the user to position their four (4) fingers in front of the camera and capture a flash image. b). Optionally use an image processing algorithm (as previously explained) to identify the location of the four prints (and other regions of interest). c). Highlight these regions to the user by for example super imposing ellipses over the print regions, and request that the user either accepts the finger print recognition as accurate, or adjust the mis-located finger print ellipses by dragging the ellipses to the correct position. This way accurate enrolment prints are assured. d). Use the accurate enrolled prints for future verification procedures. This may include the process of using the enrolled prints to find the verification prints in the verification image.

Moreover, in some implementations, in the case of capturing four (4) fingers, the detected image of the four fingers can then be split into four individual fingers by defining seams between each of the adjacent fingers, for example, by locating points where there are perturbation in the ridges orientations. These points are referred as singular points. Then, a K-mean clustering algorithm can be utilized to cluster the determined points into four (4) clusters representing the four fingers. In some implementation, K-mean can use a special distance function to compute the distance matrix that will be used in the clustering algorithm. This special function will results in less distance measures to points that locate on the same finger even if they are far with respect to the traditional Euclidian distance. Then, region growing segmentation algorithms can be utilized to segment individually each finger.

Then, for each finger, at least a region of the distal phalange of each finger can be identified within the imagery. Preferably, the finger region which is located between the tip of the finger segment and the thicker lines between the intermediate and distal phalanges is identified as it contains the most discriminative characteristics which are minutiae.

Both fingers and hands have a relatively constrained space of possible shapes making, accordingly, in some implementations, Active Shape Models and Active Appearance Models can be useful approaches for implementing contactless fingerprint recognition. For example, to locate and segment a hand from a target image, a Point Distribution Model is first computed by placing sets of points over hand features, such as fingertip boundaries, within example images. The model is then initialized within the target image by forming an initial estimation as to the hands position using a guide to user hand placement, or other image processing technique. For example, a Cascade Classifier can be used to provide an initial estimate to the hands location. The best fit for the model is then found by iteratively comparing it to image data and updating point positions.

Points of the fitted model are used to extract regions of interest for recognition. For example, points describing fingertip boundaries are used to extract fingerprints.

Similarly, an Active Shape Model describing the shape of a finger can be used to segment individual finger tips. For example, image regions containing finger tips are first found using a Cascade Classifier and then segmented using the model to remove both background and neighboring fingers. Furthermore, Active Shape Models can be tailored to individual users. For example, given a correct model fit, confirmed by the user during system enrolment, the model is adjusted to better describe that individuals hand and finger shape. This increases speed and reliability of recognition, and deviations from the model can be used to identify spoofs.

For maximal finger print extraction quality a user can be prompted to place their hand and fingers at an optimal location relative to the position of both the illuminating light source and camera, for example, providing a visual guide or outline of the optimal finger-placement on the display of the device. This could be to position the fingerprints near the center of the camera's field of view, with prints subtending a maximum angle to the camera of about +/−20 degrees. For example, fingers can be placed far enough from the light source as to minimize the angle of incidence with illuminating rays, preventing loss of detail on angled surfaces, while being close enough for sufficiently intense illumination. Concurrently, fingers are orientated to maximally reflect illumination towards the camera and positioned close enough to the camera to ensure sufficient pixel density for recognition.

Captured print quality can be further enhanced by adding additional illumination sources, or extended sources to the smartphone camera system to spread the spatial extent of the illumination source. For example by adding 4 LEDs in the corners of the smartphone or tablet light will be reflected favorably by more regions of the finger print leading to a higher print capture quality.

Once the relevant regions of the fingers are identified, at step 315, the relevant regions can be enhanced. More specifically, the mobile device processor 110, which is configured by executing the software modules 130, including, preferably, the analysis module 172, can process the portions of the imagery to enhance the detail of the imagery, for example, using a set of Gabor filters, tuned to the smoothed ridge orientation maps. In some implementation, the main objective of this image enhancing is generating fingerprint images that are similar to the images of fingerprint impression which captured using live scan sensor and usually stored in legacy databases as IAFIS. This similarity means that image captured using mobile devices are mimicking the same quality and attributes as images captured from live scan sensors. This similarity is desirable to guarantee the possibility of matching the images captured by mobile devices against images of fingerprint impression stored in legacy databases such as IAFIS.

To improve the extraction of discriminatory features from finger tips it can be advantageous to use enhancement filters to boost the contrast between ridges and furrows. In some implementations, the mobile device processor can apply Histogram Equalization to boost local image contrast by evenly distributing intensities over the possible range of values (typically [0,255] in greyscale images). This can be achieved by computing a cumulative histogram of pixel intensities, normalizing to the maximal value in the allowed range, and remapping source pixels according to their location in this distribution.

Contrast enhancement has the drawback of being indiscriminate and so enhancing background noise as well as the signal of interest. As such it can be beneficial to isolate only those signals of interest by filtering prior to contrast enhancement. For example, the processor can apply a Band-pass Filter to remove signals with frequencies that do not correspond to the expected frequency of fingerprint ridges. One such implementation removes high frequencies by subtracting a Gaussian Blur filtered source image from the raw source image. The result can then filtered again to remove low frequencies by applying another Gaussian Blur filter with appropriately smaller radius. A Histogram Equalisation can then be applied to the result of the Band-pass to attain an optimal image for feature extraction.

At step 320, the minutiae of each of the fingers is extracted and a biometric identifier is generated. As would be understood by those in the art, minutia refers to the points where the ridges of a fingerprint end, and texture refers to the pattern defined by the ridges. More specifically, the mobile device processor 110, which is configured by executing the software modules 130, including, preferably, the analysis module 172, analyzes the enhanced imagery to extract features from at least the distal region of each finger using an algorithm such as Minutiae extraction algorithm.

Most automatic systems for fingerprint comparison are based on minutiae matching; therefore, reliable minutiae extraction is an important task. Many such methods require the fingerprint gray-scale image to be converted into a skeleton image. Then, a simple image scan allows the detection of pixels that correspond to minutiae where the fingerprint ridges end and bifurcate. Extracted minutiae may be stored as sets of points in the two dimensional plane.

Finally, a minutiae-based matching algorithm can be performed by the configured processor to generate the similarity score between fingerprints. These matching algorithms calculate the similarity score between fingerprints by finding the alignment between the template and the input minutiae sets that result in the maximum number of minutiae pairings.

Features extracted from the distal region can be stored along with other features that are similarly extracted from the remaining identified regions of the fingers and/or the hand. Such features can be characterized in one or more biometric identifiers which include one or more feature vectors.

During enrollment, at step 325, such feature vectors are stored in memory as a biometric identifier (e.g., template) for use in ensuring user verification steps. Alternatively, during user verification (step 330), the biometric identifier is compared to the version stored during enrollment.

More specifically, during the verification process, the fingers of the user are captured and the biometric identifier is generated as described in relation to steps 305-320. However, at step 330, the query feature vectors are then compared with the enrolled and stored feature vectors. Based on the comparison a match score is generated by the configured processor 110 relating to the similarity of the match. If the match score represents a sufficiently close match, the user can be determined to pass the verification procedure.

In one or more implementations, the match score can be a combined match score based on matching query fingerprints (e.g., query feature vectors) to enrolled fingerprints individually and determining a combined match score. More specifically, from a database of hand images, images can be paired up, with two distinct classes of pairs: pairs of images of the same hand, and pairs of images of different hands. For each pair of finger on these hands (e.g. index with index), a matching score can be calculated which measures the closeness of these hand images, with higher scores representing a closer match.

These scores can be plotted to form score distributions. For each type of finger (e.g. ring finger), there are two distributions, those scores from matching images of the same finger from the same hand, and the same finger from a different hand (i.e. an imposter).

These score distributions can be considered as probability distributions, which give the probability that a given matching score belongs to one of the distributions. These empirically derived distributions can be smoothed of noise and compactly characterized by fitting them to a known distribution, for instance, the gamma distribution.

Given an uncharacterized pair of finger images, the exemplary identification system can be configured to determine a matching score. These fitted probability distributions can then be used to determine the ratio of probability (likelihood ratio) that the pair of finger images belong to the same finger or a different finger.

When doing a full four-finger match, the configured system can test one unknown image (the 'probe' image) against previously enrolled images of a known subject (the 'gallery' images). For each pair of probe finger against gallery finger, the system can determine a likelihood ratio. These ratios can then be multiplied together, and the final result provides an overall measure of the chance that the probe image belongs to the subject who provided the gallery image.

This method has the advantage of not being degraded by specific fingers having poor predictive ability; in particular the little finger is less likely to provide a clearly predictive match than the other fingers. It also allows some tolerance against bad images; if one finger makes a poor match, it can be compensated if another finger makes a particularly good match.

While combining scores across multiple fingers provides tolerance against bad images, it is theoretically possible for a single probe/gallery matching score to be large enough to cause an overall pass. This could make it easier to produce spoofs, for instance, if an attacker is capable of producing a very high-quality facsimile of one of the authorized user's fingers. An exemplary method to mitigate this problem can include requiring, by the processor during the matching and scoring process, a minimum number of the probe fingers to individually produce matching scores that cross a secondary threshold, as well as requiring that the combination of matching scores passes the primary matching threshold in order to determine a positive match. Accordingly, this measure would require that any successful spoof successfully duplicates that minimum number of fingers, which is a more difficult task than duplicating a single finger successfully. It can be appreciated that the minimum number of fingers scoring above the secondary threshold required by the authentication process and the value of the secondary threshold can be adjusted to trade risk of spoofing against resilience to degraded image quality, as suits the security needs of the implementation.

Typically when comparing query finger data with enrolled finger data it is important to ensure that the scales of the respective images are similar. Accordingly, during the analysis of the fingerprint imagery at step 320, the configured processor 110 can determine the fundamental frequency of the fingerprint ridges. During enrollment (e.g., step 325), the configured processor can store the fundamental frequency. During verification (e.g., step 330), the configured processor can scale the fundamental frequency of the verification print to match the fundamental frequency of the enrolled print before comparison. In addition or alternatively, the processor can normalize the frequency of the print to a prescribed reference frequency e.g., one (1), such that the actual frequency does not have to be stored. Accordingly, during recognition, the query print can be normalized to the prescribed reference value.

It should be understood that one or more pre-processing operations can be performed on the image frames prior to generating the feature vectors or prior to comparing feature vectors during authentication. By example and without limitation, pre-processing of the image data prior to analysis can include orienting the image frames in coordinate space and the like as would be understood by those skilled in the art.

Existing technologies concerning image based fingerprint identification implementing existing scaling algorithms generally miss-scale about 2% of the fingerprints resulting in false rejects during authentication. This is due in part to those algorithms using an insufficient number of reference points in an image (i.e., using only two points, the tip/starting-point of the fingerprint and the base/end-point of the print) to deduce size and scale accordingly. To improve scaling operations, according to one or more of the disclosed embodiments, the processor can implement an algorithm that analyses the average frequency of a finger print (e.g., typical number of lines per inch) and normalizes the scale of the print(s) accordingly. Since this technique judges scaling based on a larger set of the print's pixels, taken at many points across the area of the print, considerably higher reliability can be achieved during the scaling process.

Before and/or after enrollment and verification steps, the method can also include a step of detecting liveness. Liveness detection is depicted as step 335 in FIG. 3. A liveness detection method can be implemented to verify that the captured four (4) fingers image is from real fingers rather than, for example, a printed spoof or mold of the fingers. More specifically, in some implementations, the mobile device processor 110, which is configured by executing the software modules 130, including, preferably, the analysis module 172, can analyze the image quality of the fingers and determine whether they are consistent with images from live fingers and/or fake fingers, which typically have noticeable artifacts such as reduced resolution and sharpness.

For example, as further described herein, one liveness detection technique can be to prompt the user to rotate the hand during imaging and the configured processor can determine that the imaged hand is appropriately three dimensional using, for example, depth from motion techniques and depth from focus techniques. Alternatively, the system can implement techniques for passive liveness detection, for instance, to analyze the image quality to check that it is sufficiently sharp and not a low resolution (e.g., from a spoof print of the hand). The configured processor can also analyze the color of the fingers to determine whether the coloring is consistent with a live hand image and/or the known color of the user's hand. Therefore, in some implementations, the color consistence, in other words, color uniformity of the hand can be performed by detecting the fingertips and the hand simultaneously. Then, separating the area of the hand that doesn't contain the fingertips which consists of the palm and lower phalanges (i.e, the proximal and intermediate) and then determining the color histogram of this area and the color histogram of the 4 detect fingertips areas. Finally, in some implementation, comparing these two histograms can be utilized as a test for the color uniformity of the hand and fingers to determine the liveness measure, especially, if the attacker is using molds (i.e., fake fingers) to spoof the system. In addition, the configured processor can also request that user make one or more gestures with their fingers, for example, spread and close fingers or move certain fingers in a particular manner.

Moreover, in some implementations, a classifier can be trained to distinguish live from spoof. The classifier can be trained so that it learns the difference between real finger images and various spoof images. The processor implementing the classifier would then be configured to provide a pass fail result based in its training.

Further, in some implementations, as an extra factor of biometrics liveness, the positions of the finger prints in the image could be taken into account, i.e. the genuine user will have first, second, third and fourth fingers of particular lengths. So that when the user holds their hand with fingers outstretched and closed together, the positions of the four (4) finger prints should have a relative positioning that is consistent with that particular user. This information could be used as an additional security check to help prevent spoof attack. For example a hacker who finds latent prints on a phone screen is unlikely to be able to deduce the lengths of the users' fingers, and so would be unlikely to present them correctly.

Further to the exemplary systems and method described in relation to FIG. 3, various alternatives and variations are contemplated. In some implementations, the enrollment images of the user's fingers are not necessarily captured by the mobile device camera. Instead, the fingers feature vectors could be acquired from an alternative source such as a pre-recorded database of finger images.

In some implementations, during the enrollment process, for capture of the fingers (for example and without limitation, four or ten fingers with improved resolution, the image of each finger may be captured sequentially in individual images. In this case, during the enrollment procedure, the configured processor displaying an on screen finger guide can prompt the user to position one finger on screen at a time and the segmentation algorithm can be used to identify the distal phalange and fingerprint region of the fingers individually.

In some implementations, instead of limiting the matching process (e.g., step 330) to the comparison of the fingertip (e.g., distal phalange) regions, the comparison could include other parts of the hand in addition to the fingerprints or instead of the fingerprints. For example the region of interest could include any parts of the hand with detectable patterning, or the distal and intermediate phalanges, or the metacarpals. Some of these regions have the added advantage that they are more resistance to spoof attack thus providing a higher level of security. For instance the user's fingertip prints can often be found on the smartphone case or other surfaces that the user has touched. These latent finger prints can be copied by an imposter, and a mold created that could pass verification. However, the prints at the metacarpals are much harder to find since it is less common for these regions of the hand to contact surfaces to leave latent prints.

In some implementations, instead of using singular points to separate the four finger cluster into separate fingers, the user could be prompted to spread their fingers during capture. The fingers could then be isolated using a segmentation algorithm, and a contour deformation method could be used to identify the positions of each fingertip.

In some implementations, segmentation of the pertinent finger regions could be performed using skin color, frequency and orientation. For example, a Sobel operator could be implemented by the configured processor to emphasize regions that are in focus (i.e. the fingers rather than the background), to aid the segmentation process. In addition or alternatively, segmentation could also be done by simply extracting fixed regions from the captured image relating to regions that the user was guided to place their fingers during the capture process.

In some implementations, during the authentication process, segmentation can be performed using the enrolled print information. By segmenting and identifying and/or matching fingerprint features based on a print template generated during enrollment can provide improvements over existing techniques. For example existing image based fingerprint identification techniques isolate a fingerprint in the same manner during enrollment and authentication and, as a result, isolates a single fingerprint from imagery with unsatisfactory success for reliable use. In some instances, successful isolation using the existing methods occurs only 96% of the time resulting in 4% false rejects during authentication. By using that technique separately on multiple fingers, this problem is compounded.

However, according to one or more of the disclosed embodiments, a different algorithm for fingerprint isolation is performed by the configured processor, namely, one that uses the enrolled print to find the finger(s) and isolate/match the prints during authentication. This provides significantly more robust performance. In some implementations, the configured processor can implement the segmentation process, for example, by extracting finger features (such as minutiae) from the entire four finger image, and locating the finger regions by exhaustively comparing all locations in the image with the finger features from the enrolled prints. The finger region will be known to be located where the enrolled finger is found to match the finger features in the image. Furthermore to minimize the possibility of a false match by random features in the image, the validity of the matched regions could be checked, for example in the case of capturing four (4) fingers procedure, by ensuring that 1st, 2nd, 3rd, and 4th fingers are found roughly as expected from the user guidance overlay image, the skin color is as expected, and the like (e.g, template matching using enrollment template to guide the comparison). Moreover, rather than using this process to search the whole image for finger locations, the search range could be restricted to the areas that fingers are anticipated from the user guidance overlay image.

In addition or alternatively to basing the finger scaling on the fundamental ridges frequency, the processor 110 can be configured to scale the print based on one or more of: the width of the segmented four finger cluster, the width or length of each fingers region of interest, or on specific points on the finger such as singular points and the thicker lines at a phalange joint.

As well as (or instead of) matching finger based on minutiae, the processor 110 can also be configured to match prints based on texture.

Moreover, in some implementations, instead of using one image for the fingers, several images could be used to enroll or authenticate a user. The multiple images can be captured by the configured processor 110 using the camera 145 at various exposures, and/or focal distances to create an image with enhanced depth of field and/or dynamic range. Capturing imagery with such varying exposures and/or focal distances can help to ensure that the focus of the prints at various locations across the hands is optimal. Accordingly, the configured processor can select and analyze the image(s) or portions of the image that have optimal focus on the finger portion of interest.

In addition or alternatively, liveness detection can be implemented by checking that other metrics are consistent with that of a real finger rather than a print or video or molded finger spoof. These metrics could include analysis of specular reflections from the flash captured in the imagery, analysis of specular reflections from the flash in comparison to an image taken without the flash, color, colorfulness metrics (so as to reject black and white and monochrome spoofs).

In some implementations, liveness can be detected by the analysis of specular reflections or depth from focus information obtained from imagery of the fingers. By way of non-limiting example, exemplary systems and methods for liveness determination based on specular reflections and depth-from-focus information are described herein and in co-pending and commonly assigned U.S. patent application Ser. No. 62/066,957 titled SYSTEMS AND METHODS FOR PERFORMING IRIS IDENTIFICATION AND VERIFICATION USING MOBILE DEVICES UTILIZING VISIBLE SPECTRUM LIGHTING, filed on Oct. 15, 2014, which is hereby incorporated by reference as if set forth in its entirety herein. Liveness can also be detected by the analysis of dynamic movement of the fingers (e.g., finger gestures) such as tilting the fingers, or spreading/narrowing the fingers as depicted throughout a sequence of images captured by the camera. By way of non-limiting example, exemplary systems and methods for liveness determination based on dynamic movement of biometric features and gestures are described herein and in co-pending and commonly assigned U.S. patent application Ser. No. 62/041,803, entitled "SYSTEM AND METHOD FOR DETERMINING LIVENESS" filed Aug. 26, 2014, which is hereby incorporated by reference as if set forth in its entirety herein.

Figure 5A:
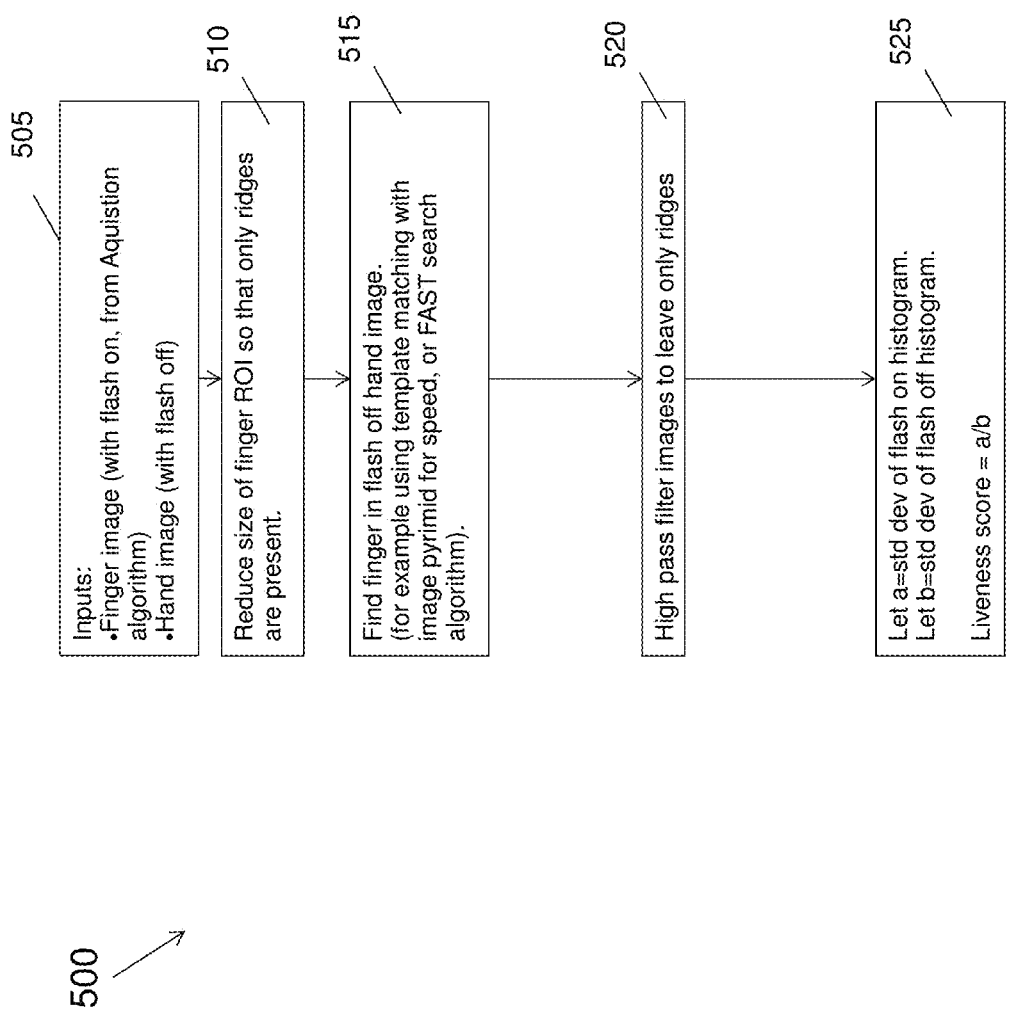
FIG. 5A is a flow diagram showing a routine for detecting liveness from visual imagery of fingers in accordance with at least one embodiment disclosed herein.
Figure 5B:
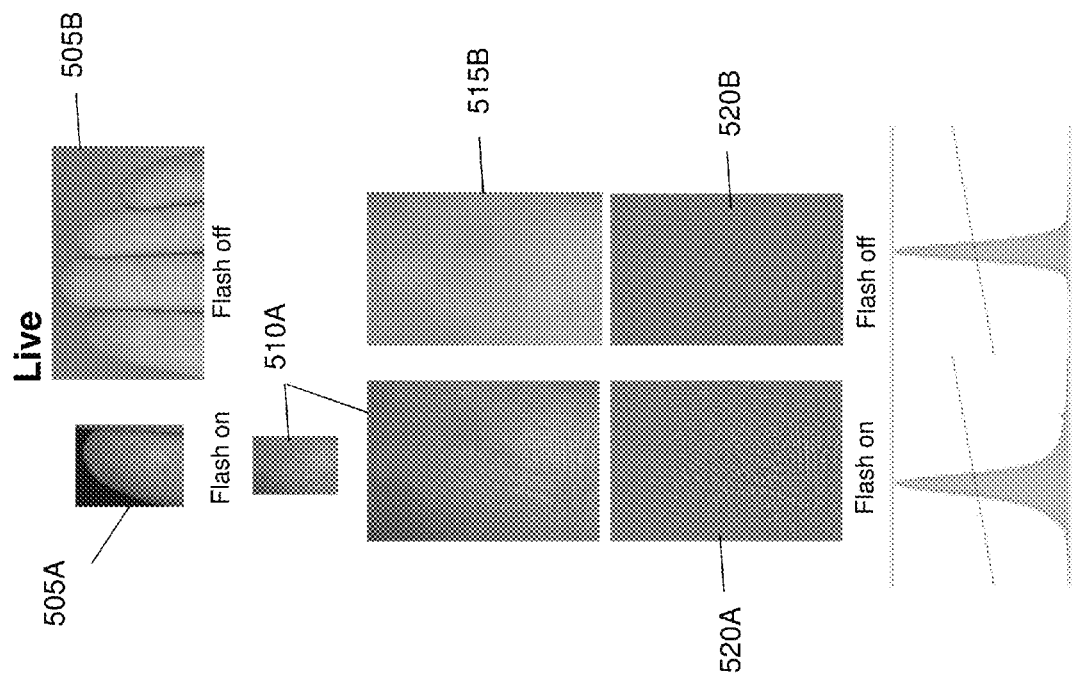
FIG. 5B is a series of images captured in accordance with the routine for detecting liveness from visual imagery of fingers.
Figure 5C:
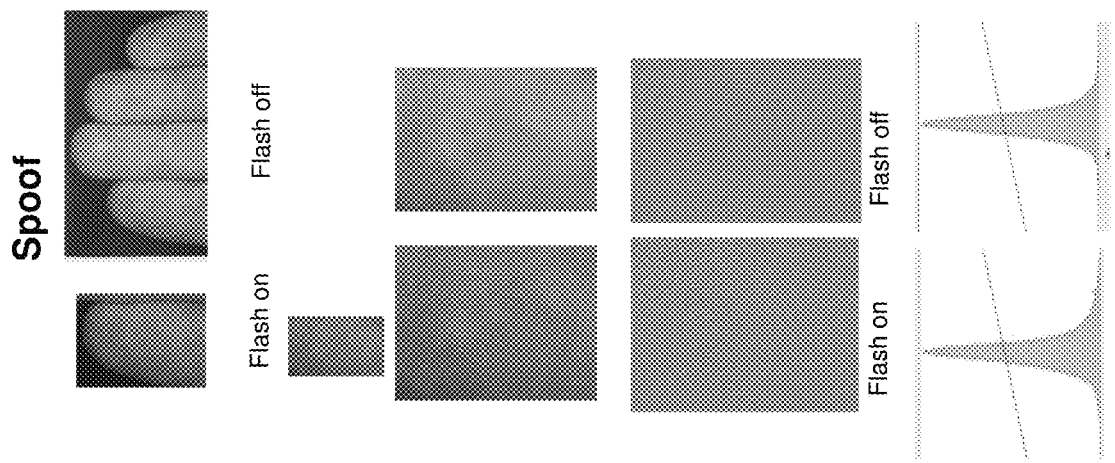
FIG. 5C is a series of images captured in accordance with the routine for detecting liveness from visual imagery of fingers.

In some implementations, liveness can be detected by performing a reflectivity analysis of light emitted onto the finger ridges during capture of imagery of the fingers. Live finger ridges reflect flash non uniformly, whereas printed fingers reflect flash uniformly. Accordingly, ridge reflectivity properties captured in the imagery of the fingers can be analyzed to determine liveness. An exemplary process for determining liveness based on the reflectivity is further described herein in relation to the flow-diagram of FIG. 5, and corresponding images in FIGS. 5B-5C. At step 505, the inputs to the liveness detection algorithm are obtained. The inputs include high-resolution image(s) of one or more of the fingers captured with the flash on, as well high resolution imagery of the fingers captured with the flash off. Exemplary flash-on 505A and flash-off images 505B of the finger(s) are shown in FIG. 5B. At steps 510, the flash-on image(s) is resized such that the fingerprint within the image is isolated. At steps 515, the regions in the flash-off image(s) that includes the corresponding finger is segmented (for example according to the exemplary fingerprint segmentation algorithms described above). Accordingly, the fingerprint depicted in the flash-on image and the corresponding fingerprint in the flash-off images are isolated for further processing. Exemplary isolated flash-on and flash-off images of the fingertip are shown as image 510A and 515B, respectively, in FIG. 5B. Then at step 520 a high pass filter is applied to retain the portion of the images that depict the ridges. Exemplary filtered flash-on and flash-off images of the fingertip are shown as images 520A and 520B in FIG. 5B. Then at step 525, the liveness score is calculated. In one exemplary arrangement, the liveness score is calculated as a function of the standard deviation (a) of the histogram generated from the filtered flash-off image and the corresponding standard deviation (b) of the histogram generated from the filtered flash-on image (i.e., liveness score=a/b). By way of example, similar images obtained during the application of the process 500 on spoof images of the fingerprints are depicted in FIG. 5C. In other implementation, other measures can be computed from the histograms of the filtered flash-on and flash-off images to calculate the liveness score. The following is some examples of the measures that can be used: (1) the difference between the means of the histograms, (2) the difference between the means of the histogram frequencies, (3) the ratio of the standard deviation of the histogram frequencies, (4) the difference between the kurtosis of the histograms, and/or (5) the number of the corresponding key points in the filtered flash-on and flash-off images. In some implementation, the difference in the pixel intensities of the background of the flash-on and flash-off images can be used as a liveness measure.

Figure 6A:
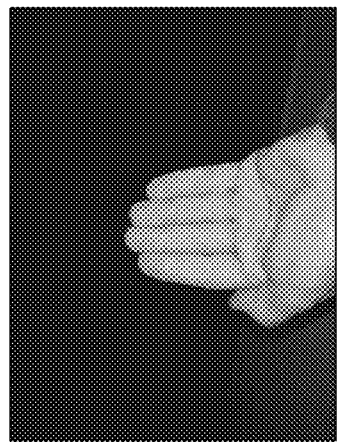
FIG. 6A depicts a captured image of fingers and corresponding ridge reflectivity image generated in accordance with at least one embodiment disclosed herein.
Figure 6A:
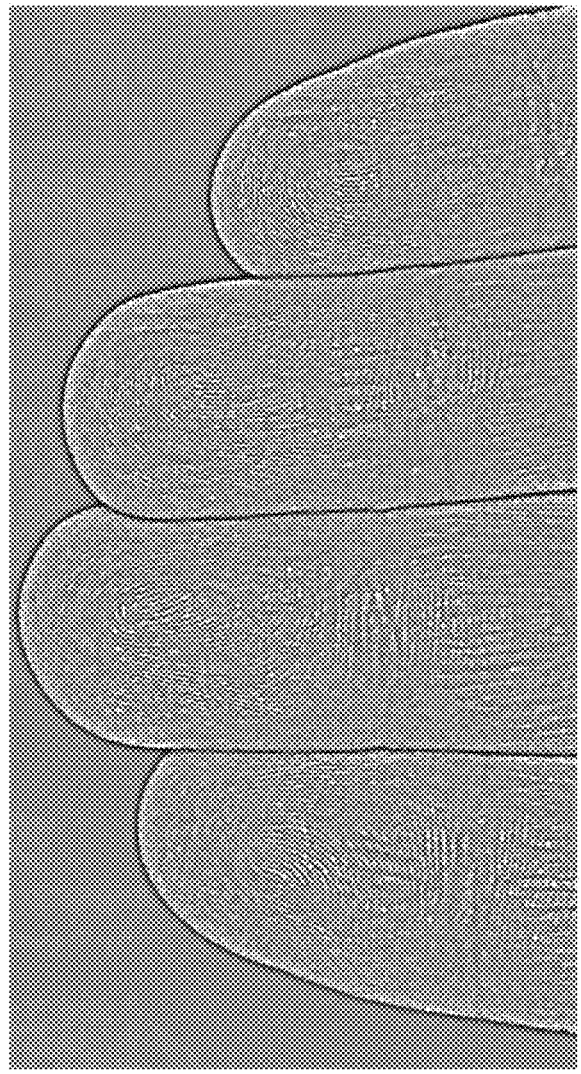
Figure 6B:
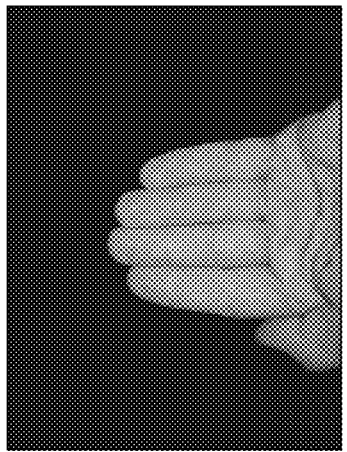
FIG. 6B depicts a captured image of fingers and corresponding ridge reflectivity image generated in accordance with at least one embodiment disclosed herein.
Figure 6B:
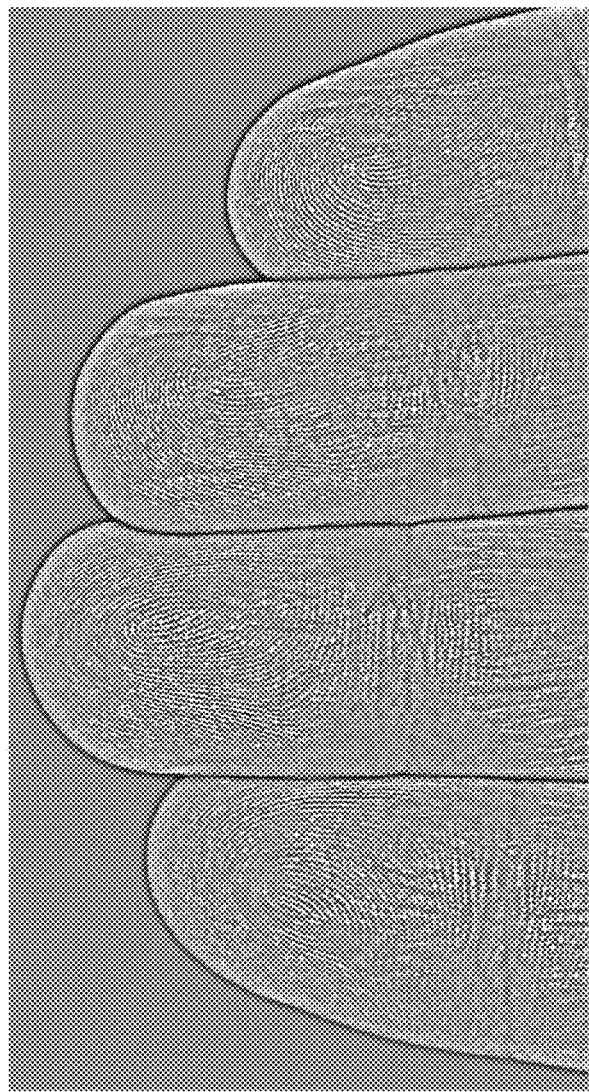
Figure 6C:
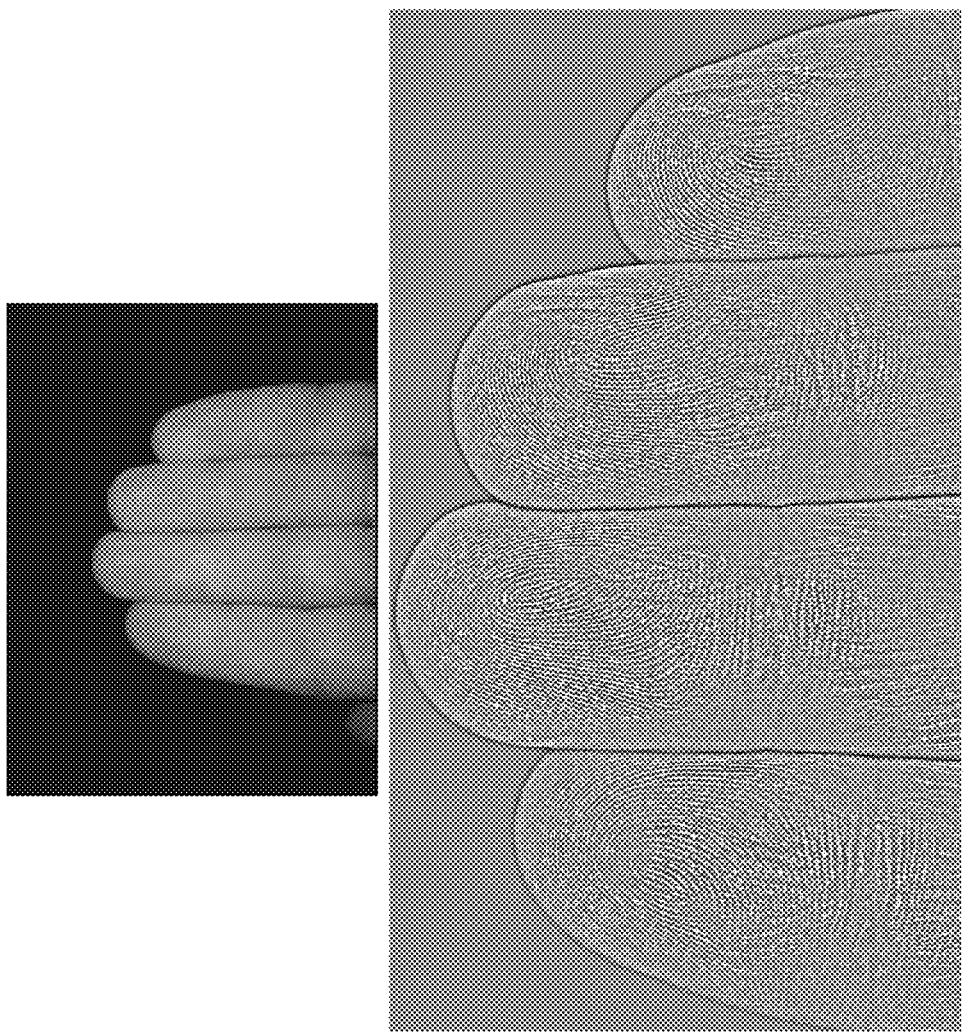
FIG. 6C depicts a captured image of fingers and corresponding ridge reflectivity image generated in accordance with at least one embodiment disclosed herein.
Figure 6D:
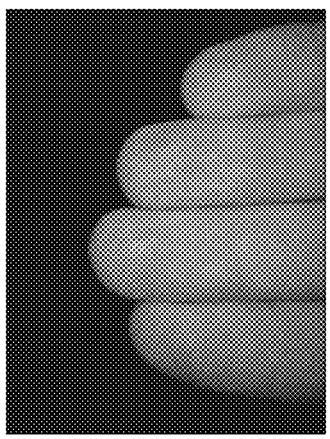
FIG. 6D depicts a captured image of fingers and corresponding ridge reflectivity image generated in accordance with at least one embodiment disclosed herein.
Figure 6D:
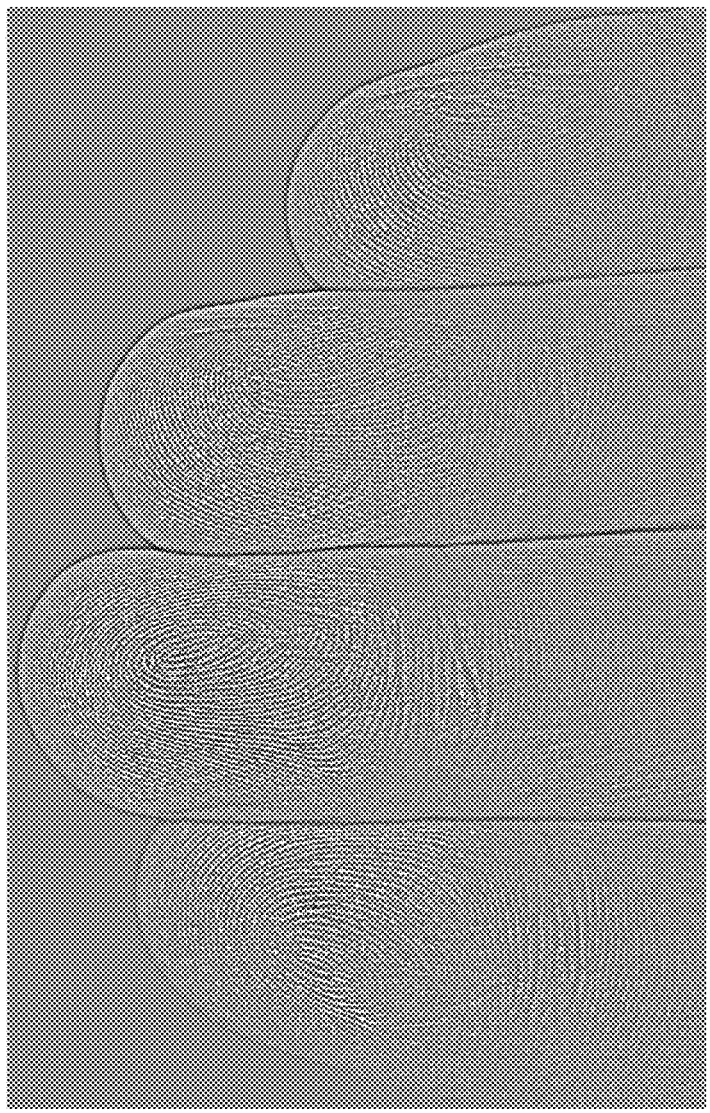

FIGS. 6A-6F depict exemplary ridge images of fingers captured at various positions in relation to the camera field of view. In particular, FIG. 6A depicts a captured image and corresponding ridge image for fingers that are too far from the camera and have low print resolution. FIG. 6B depicts a captured image and corresponding ridge image for fingers that are too far from the camera and have low print resolution. FIG. 6C depicts a captured image and corresponding ridge image showing good resolution due to finger placement that is central in the field of view and sufficiently close to the camera. FIG. 6D depicts a captured image and corresponding ridge image showing a loss of reflections at the edges of the index and little finger due to high angle LED reflections. FIG. 6E depicts a captured image and corresponding ridge image showing a loss of reflections at the tips of the fingers due to high angle LED reflections as fingers are placed near the edge of the camera field of view. FIG. 6F depicts a captured image and corresponding ridge image showing a loss of reflections at the tips of the fingers due to high angle LED reflections as fingers are placed near the edge of the camera field of view.

In some implementations, fingerprint based authentication can further be combined with facial identification to provide the enhanced security/reliability of multi-modal biometrics. For example, in the case of a smartphone, the user's four fingers could be captured using a smartphones rear facing camera simultaneously or sequentially as face and/or iris capture is made using the front facing camera. By way of non-limiting example, exemplary systems and methods for generating hybrid biometric identifiers and performing identification/authentication using hybrid biometric identifiers are described in co-pending and commonly assigned U.S. patent application Ser. No. 62/156,645, entitled SYSTEM AND METHOD FOR GENERATING HYBRID BIOMETRIC IDENTIFIERS, filed on May 4, 2015, which is hereby incorporated by reference as if set forth in its entirety herein.

By way of further example, in addition to characterizing a user by generating a finger feature vectors according to routine 300, as described above, additional biometric features can be extracted from the image(s) captured at step 305, or biometric information captured separately. Such additional biometric features can include by way of example and without limitation, soft biometric traits and hard biometric traits. "Soft biometric" traits are physical, behavioral or adhered human characteristics whereas hard biometrics such as, fingerprint, iris, periocular characteristics and the like are generally invariant. By way of further example, soft biometric traits can include physical traits such as skin textures, or skin colors. Soft biometrics can also include motion as detected by smartphone gyroscope/accelerometer, eye motion characteristics as detected by eye tracking algorithms and head motion characteristics as detected by tracking the movement of a face and/or head. Such biometric features can be extracted and characterized according to the foregoing method as well as existing biometric analysis algorithms. In addition, the additional characterizations of the user's biometric features can be encoded as part of the biometric identifier generated at step 320, or otherwise included in a composite biometric identifier which includes the fingerprint biometric identifier, for example by fusing multiple biometric identifiers.

In one or more exemplary embodiments, image capture of the fingers can be performed at a greater distance than typically performed by a user using a hand-held device such as a smartphone. The exemplary embodiments can be similarly implemented using systems configured to capture imagery using short-range to long-range image acquisition modalities possible. Image acquisition at a distance can be performed with optical modalities such as optical based systems of various kinds, for example using telephoto-lens, as well as laser focused based systems, and sonar-based systems. Applications of these types of longer range image capture modalities can be critical in law enforcement, military and intelligence, and can ultimately be deployed in commercial environments.

Moreover, image capture can be performed while the subject is not stationary, such implementations are referred to herein as Fingerprint on the move (FOM) systems. This type of opportunistic capture can happen concurrently over time as a person's fingerprints become visible to special operators tasked with this job in covert operation and/or surveillance modes.

For capture at a distance super resolution techniques can be implemented to increase print quality by using data from multiple frames, and to stitch partial print regions from different frames together into a larger print image. By way of non-limiting example, exemplary systems and methods for performing super-resolution techniques to generate identifiers based on multiple image captures and performing identification/authentication using same are described herein and in co-pending and commonly assigned U.S. patent application Ser. No. 62/066,957 titled SYSTEMS AND METHODS FOR PERFORMING IRIS IDENTIFICATION AND VERIFICATION USING MOBILE DEVICES UTILIZING VISIBLE SPECTRUM LIGHTING, filed on Oct. 15, 2014 which was previously incorporated by reference herein.

In addition, it can be appreciated that the foregoing procedures for performing fingerprint acquisition and identification can be similarly performed using imagery captured in the NIR light and IR light spectrum, and using devices equipped with NIR and/or IR light emitters. This implementation can be especially useful for incorporating vein pattern identification as an additional biometric factor. By way of non-limiting example, exemplary systems and methods for capturing biometric imagery in the NIR and IR spectral bands using NIR and IR light emitters and performing identification/authentication are described herein and in co-pending and commonly assigned U.S. patent application Ser. No. 62/129,277, entitled "SYSTEMS AND METHODS FOR PERFORMING IRIS IDENTIFICATION AND VERI- FICATION USING MOBILE DEVICES" filed Mar. 6, 2015, which is hereby incorporated by reference as if set forth in its entirety herein.

At this juncture, it should be noted that although much of the foregoing description has been directed to systems and methods for authenticating a user according to the user's biometric features that are captured using conventional smartphone devices, the systems and methods disclosed herein can be similarly deployed and/or implemented in scenarios, situations, and settings beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for authenticating a user according to the user's biometrics. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A method for performing fingerprint recognition, the method comprising:
   capturing, by a mobile device having a camera, a storage medium, instructions stored on the storage medium, and a processor configured by executing the instructions, images depicting a plurality of fingers of a subject;
   detecting, with the processor applying a plurality of finger detection algorithms, the plurality of fingers depicted in one or more of the images using a finger detection algorithm, wherein the plurality of finger detection algorithms include cascade classifiers;
   based on the detecting, processing, with the processor, at least one image using a segmentation algorithm to identify a respective fingertip segment for one or more of the fingers detected as being depicted in the at least one image;
   extracting, with the processor for each finger, discriminatory features from the respective fingertip segment;
   generating a biometric identifier including the extracted discriminatory features; and
   storing the generated biometric identifier in the memory with the processor.

2. The method of claim 1, wherein the plurality of finger detection algorithms are selected and applied by the processor based on one or more of: measured environmental conditions, hardware capabilities of the mobile device, and one or more expected characteristics of the fingers to be detected.

3. The method of claim 1, further comprising:
determining, with the processor from one or more of the images, that the plurality of fingers within the one or more images are positionally stable.

4. The method of claim 1, further comprising:
computing an adaptive skin model based on one or more of the images; and
processing the one or more images based on the adaptive skin model.

5. The method of claim 4, wherein processing according to the adaptive skin model comprises:
enhancing the at least one image with the processor, wherein enhancing includes brightening regions of the at least one image having pixels determined to represent skin relative to regions having pixels determined to not represent skin.

6. The method of claim 1, wherein extracting discriminatory features from the respective fingertip segment comprises:
extracting from the respective fingertip segment, minutiae of a respective finger according to a minutiae extracting algorithm.

7. The method of claim 1, further comprising:
capturing, with the processor using the camera, the at least one image in response to detecting the plurality of fingers depicted in one or more of the images.

8. The method of claim 1, further comprising:
capturing, with the camera, the plurality of images as a feed of images;
displaying, with the processor on a display, the feed of images in near-real time and a finger placement guide overlaid over the feed;
detecting, with the processor using a finger finding algorithm, the plurality of fingers depicted in one or more images of the feed;
determining, with the processor, whether the detected plurality of fingers are aligned with the finger placement guide; and
capturing, with the processor using the camera, the at least one image in response to detecting an alignment of the plurality of fingers with the guide.

9. The method of claim 1, further comprising:
matching, with the processor, the generated biometric identifier to a previously stored biometric identifier associated with the user;
generating, based on the matching, a similarity score between the generated biometric identifier and the stored biometric identifier; and
verifying that the subject is the user based on the similarity score.

10. A method for performing fingerprint recognition, the method comprising:
capturing, by a mobile device having a camera, a storage medium, instructions stored on the storage medium, and a processer configured by extracting the instructions, images depicting a plurality of fingers of a subject;
detecting, with the processor using a finger detection algorithm, the plurality of fingers depicted in one or more of the images using a finger detection algorithm, wherein the step of detecting the one or more fingers comprises:
selecting at least a first finger detection algorithm and a second finger detection algorithm,
detecting, by the processor using the first and second finger detection algorithms, at least one candidate set of fingers depicted in the one or more images, wherein the first and second finger detection algorithms are classifiers, and wherein the second finger detection algorithm is a classifier that is trained differently from the first finger detection algorithm,
computing a quality metric representing a likelihood that the at least one candidate set of fingers represents the plurality of fingers, and
based on the quality not meeting a prescribed threshold, repeating the preceding detecting and computing steps to detect one or more other candidate sets of fingers and compute a respective quality metric;
based on the detecting, processing, with the processor, at least one image using a segmentation algorithm to identify a respective fingerprint segment for one or more of the fingers detected as being depicted in the at least one image:
extracting, with the processor for each finger, discriminatory features from the respective fingertip segment;
generating a biometric identifier including the extracted discriminatory features; and
storing the generated biometric identifier in the memory with the processor.

11. A method for performing fingerprint recognition, the method comprising:
capturing, by a mobile device having a camera, a storage medium, instructions stored on the storage medium, and a processor configured by executing the instructions, images depicting a plurality of fingers of a subject;
detecting, with the processor using a finger detection algorithm, the plurality of fingers depicted in one or more of the images using a finder detection algorithm;
based on the detecting, processing, with the processor, at least one image using a segmentation algorithm to identify a respective fingertip segment for one or more of the fingers detected as being depicted in the at least one image, wherein the step of processing at least one image using a segmentation algorithm to identify a respective fingertip segment for one or more fingers comprises:
analyzing, with the processor using one or more classifiers, at least a portion of the at least one image that depicts the plurality of fingers,
identifying candidate fingertip segments and assigning a respective score using the one or more classifiers, and
selecting the respective fingertip segment for the one or more fingers from among the set of candidate fingertip segments based on the respective scores;
extracting, with the processor for each finger, discriminatory features from the respective fingertip segment;
generating a biometric identifier including the extracted discriminatory features; and
storing the generated biometric identifier in the memory with the processor.

12. A method for performing fingerprint recognition, the method comprising:
capturing, by a mobile device having a camera, a storage medium, instructions stored on the storage medium, and a processor configured by executing the instructions, images depicting a plurality of fingers of a subject;
detecting, with the processor using a finger detection algorithm, the plurality of fingers depicted in one or more of the images;

processing, with the processor from at least one image using a segmentation algorithm, to identify a respective fingertip segment for one or more fingers depicted in the at least one image;

extracting, with the processor for each finger, discriminatory features from the respective fingertip segment;

generating a biometric identifier including the extracted discriminatory features, wherein generating the biometric identifier includes:

determining, for the respective fingertip segment depicted in the at least one of the images, a frequency of fingerprint ridges, and scaling the biometric identifier based on the frequency of fingerprint ridges and a prescribed reference frequency; and storing the generated biometric identifier in the memory with the processor.

13. A method for performing fingerprint recognition, the method comprising:

capturing, by a mobile device having a camera, a storage medium, instructions stored on the storage medium, and a processor configured by executing the instructions, images depicting a plurality of fingers of a subject, and wherein capturing includes capturing a first image depicting the plurality of fingers at a first position relative to the camera and a second image depicting the plurality of fingers at a second position relative to the camera, wherein the first and second positions are different;

detecting, with the processor using a finger detection algorithm, the plurality of fingers depicted in one or more of the images;

processing, with the processor from at least one image using a segmentation algorithm, to identify a respective fingertip segment for one or more fingers depicted in the at least one image;

extracting, with the processor for each finger, discriminatory features from the respective fingertip segment;

generating a biometric identifier including the extracted discriminatory features;

storing the generated biometric identifier in the memory with the processor;

determining, from at least the first and second images depicting the plurality of fingers from different respective positions relative to the camera, that the plurality of fingers are three-dimensional objects; and verifying the subject is a live subject based on the determination that the plurality of fingers are three-dimensional objects.

14. A system for performing fingerprint recognition comprising:

a mobile device having a camera, a storage medium, a display, and a processor in operative communication with the camera, the display and the storage medium;

a software application comprising instructions in the form of code stored on the storage medium, wherein the instructions are executable in the processor and configure the processor to:

capture images depicting a plurality of fingers of a subject using the camera, detect, by applying a plurality of finger detection algorithms, the plurality of fingers depicted in one or more of the images, wherein the plurality of finger detection algorithms include cascade classifiers, based on the detection of the plurality of fingers, process at least one image using a segmentation algorithm, to identify a respective fingertip segment for one or more fingers detected as being depicted in the at least one image, extract, for each finger, discriminatory features from the respective fingertip segment, generate a biometric identifier including the extracted discriminatory features, and store the generated biometric identifier in the memory.

15. The system of claim 14, wherein the software application configures the processor to select and apply the plurality of finger detection algorithms based on one or more expected characteristics of the fingers to be detected.

16. The system of claim 14, wherein the software application further configures the processor to:

compute an adaptive skin model based on one or more of the images; and process the one or more images based on the adaptive skin model.

17. The system of claim 16, wherein the processor is configured to process the one or more images according to the adaptive skin model by:

enhancing the at least one image, wherein enhancing includes brightening regions of the at least one image having pixels determined to represent skin relative to regions having pixels determined to not represent skin.

18. The system of claim 14, wherein the processor is configured to extract discriminatory features from the respective fingertip segment by:

extracting from the respective fingertip segment, minutiae of a respective finger according to a minutiae extracting algorithm.

19. The system of claim 14, wherein the software application further configures the processor to:

capture, with the processor using the camera, the at least one image in response to detecting the plurality of fingers depicted in one or more of the images.

20. The system of claim 14, wherein the software application further configures the processor to:

capture, with the camera, the plurality of images as a feed of images;

display, with the display, the feed of images in near-real time and a finger placement guide overlaid over the feed;

detect, using a finger finding algorithm, the plurality of fingers depicted in one or more images of the feed;

determine whether the detected plurality of fingers are aligned with the finger placement guide; and capture, using the camera, the at least one image in response to detecting an alignment of the plurality of fingers with the guide.

21. A system for performing fingerprint recognition comprising:

a mobile device having a camera, a storage medium, a display, and a processor in operative communication with the camera, the display and the storage medium;

a software application comprising instruction in the form of code stored on the storage medium, wherein the instructions are executable in the processor and configure the processor to:

capture images depicting a plurality of fingers of a subject using the camera, detect, using a finger detection algorithm, the plurality of fingers depicted in one or more of the images, wherein the software application configures the processor to detect the one or more fingers by:

selecting at least a first finger detection algorithm and a second finger detection algorithm, wherein the first and second finger detection algorithms are classifiers, and wherein the second finger detection algorithm is a classifier that is trained differently from the first finger detection algorithm;

detecting, by the processor using the first and second finger detection algorithms, at least one candidate set of fingers depicted in the one or more images;

computing a quality metric representing a likelihood that the at least one candidate set of fingers represents the plurality of fingers; and based on the quality not meeting a prescribed threshold, repeating the preceding detecting and computing steps to detect one or more other candidate sets of fingers and compute a respective quality metric;

based on the detection of the plurality of fingers, process at least on image using a segmentation algorithm, to identify a respective fingertip segment for one or more fingers detected as being depicted in the at least one image, extract, for each finger, discriminatory features from the respective fingertip segment, generate a biometric identifier including the extracted discriminatory features, and store the generated biometric identifier in the memory.

22. A system for performing fingerprint recognition comprising:

a mobile device having a camera, a storage medium, a display, and a processor in operative communication with the camera, the display and the storage medium;

a software application comprising instructions in the form of code stored on the storage medium, wherein the instructions are executable in the processor and configure the processor to:

capture images depicting a plurality of fingers of a subject using the camera, detect, using a finger detection algorithm, the plurality of fingers depicted in one or more of the images, based on the detection of the plurality of fingers, process at least one image using a segmentation algorithm, to identify a respective fingertip segment for one or more fingers detected as being depicted in the at least one image, wherein the processor is configured to process the at least one image by:

analyzing, using one or more classifiers, at least a portion of the at least one image that depicts the plurality of fingers, identifying candidate fingertip segments and assign a respective score using the one or more classifiers, and selecting the respective fingertip segment for the one or more fingers from among the set of candidate fingertip segments based on the respective scores;

extract, for each finger, discriminatory features from the respective fingertip segment, generate a biometric identifier including the extracted discriminatory features, and store the generated biometric identifier in the memory.

23. A system for performing fingerprint recognition comprising:

a mobile device having a camera, a storage medium, a display, and a processor in operative communication with the camera, the display and the storage medium; and a software application comprising instructions in the form of code stored on the storage medium, wherein the instructions are executable in the processor and configure the processor to:

capture images depicting a plurality of fingers of a subject using the camera, detect, using a finger detection algorithm, the plurality of fingers depicted in one or more of the images, process at least one image using a segmentation algorithm, to identify a respective fingertip segment for one or more fingers depicted in the at least one image, extract, for each finger, discriminatory features from the respective fingertip segment, generate a biometric identifier including the extracted discriminatory features, determine a frequency of fingerprint ridges for the respective fingertip segment depicted in the at least one of the images, scale the biometric identifier based on the frequency of fingerprint ridges and a prescribed reference frequency, and store the generated biometric identifier in the memory.

24. A system for performing fingerprint recognition comprising:

a mobile device having a camera, a storage medium, a display, and a processor in operative communication with the camera, the display and the storage medium; and a software application comprising instructions in the form of code stored on the storage medium, wherein the instructions are executable in the processor and configure the processor to:

capture, using the camera, images depicting a plurality of fingers of a subject including a first image depicting the plurality of fingers at a first position relative to the camera and a second image depicting the plurality of fingers at a second position relative to the camera, wherein the first and second positions are different, detect, using a finger detection algorithm, the plurality of fingers depicted in one or more of the images, process at least one image using a segmentation algorithm, to identify a respective fingertip segment for one or more fingers depicted in the at least one image, extract, for each finger, discriminatory features from the respective fingertip segment, generate a biometric identifier including the extracted discriminatory features, store the generated biometric identifier in the memory, determine, from at least the first and second images depicting the plurality of fingers from different respective positions relative to the camera, that the plurality of fingers are three-dimensional objects, and verify the subject is a live subject based on the determination that the plurality of fingers are three-dimensional objects.

* * * * *

UNITED STATES PATENT AND TRADEMARK OFFICE
CERTIFICATE OF CORRECTION

PATENT NO. : 10,521,643 B2
APPLICATION NO. : 15/704561
DATED : December 31, 2019
INVENTOR(S) : Mather et al.

It is certified that error appears in the above-identified patent and that said Letters Patent is hereby corrected as shown below:

In the Claims

In Column 30, Line 48-49:
Change "one or more of the images using a finger detection algorithm" to -- one or more of the images --.

In Column 31, Line 59-60:
Change "one or more of the images using a finger detection algorithm" to -- one or more of the images --.

In Column 32, Line 31-32:
Change "one or more of the images using a finger detection algorithm" to -- one or more of the images --.

Signed and Sealed this
Twenty-sixth Day of April, 2022

Katherine Kelly Vidal
*Director of the United States Patent and Trademark Office*